United States Patent
Ito et al.

(10) Patent No.: US 11,164,347 B2
(45) Date of Patent: Nov. 2, 2021

(54) INFORMATION PROCESSING APPARATUS, INFORMATION PROCESSING METHOD, AND PROGRAM

(71) Applicant: Saturn Licensing LLC, New York, NY (US)

(72) Inventors: Akihiko Ito, Tokyo (JP); Tsuyoshi Takagi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/345,343

(22) PCT Filed: Oct. 25, 2017

(86) PCT No.: PCT/JP2017/038471
§ 371 (c)(1),
(2) Date: Apr. 26, 2019

(87) PCT Pub. No.: WO2018/088213
PCT Pub. Date: May 17, 2018

(65) Prior Publication Data
US 2019/0318515 A1 Oct. 17, 2019

(30) Foreign Application Priority Data
Nov. 8, 2016 (JP) .............................. JP2016-218151

(51) Int. Cl.
*G06T 11/20* (2006.01)
*G06T 11/60* (2006.01)
*G06F 40/258* (2020.01)

(52) U.S. Cl.
CPC .......... *G06T 11/206* (2013.01); *G06F 40/258* (2020.01); *G06T 11/60* (2013.01)

(58) Field of Classification Search
CPC ................................. G06T 11/206; H03J 5/02
See application file for complete search history.

(56) References Cited

U.S. PATENT DOCUMENTS

| 7,603,682 B1 | 10/2009 | Akiyama et al. |
| 2005/0208996 A1* | 9/2005 | Friedman ............ G07F 17/3255 463/25 |

(Continued)

FOREIGN PATENT DOCUMENTS

| JP | 62-102698 | 5/1987 |
| JP | 2003111106 A | 4/2003 |

(Continued)

OTHER PUBLICATIONS

International Search Report corresponding to PCT/JP2017/038471, dated Jan. 16, 2018, 3 pgs.

*Primary Examiner* — Yi Yang
(74) *Attorney, Agent, or Firm* — Lerner, David, Littenberg, Krumholz & Mentlik, LLP

(57) ABSTRACT

An information processing apparatus according to one aspect of the present technology acquires a viewing log of a content item including at least one of a moving image or a sound, acquires display data representing details of the content item at each time, and displays a chart representing a transition of a viewing state of the content item specified on the basis of the viewing log, and the display data representing details of the content item at each time in a time zone for which the transition of the viewing state is represented by the chart, on a screen that is one and the same. The present technology can be applied to a system used for monitoring the viewing state of the content item.

12 Claims, 15 Drawing Sheets

(56) References Cited

U.S. PATENT DOCUMENTS

| | | | | |
|---|---|---|---|---|
| 2006/0010470 | A1* | 1/2006 | Kurosaki | H04N 21/44222 |
| | | | | 725/46 |
| 2009/0006284 | A1* | 1/2009 | Liu | G06F 16/951 |
| | | | | 706/12 |
| 2010/0110079 | A1* | 5/2010 | Kirkendall-Rodriguez | |
| | | | | G06Q 30/0201 |
| | | | | 345/440 |
| 2012/0079080 | A1* | 3/2012 | Pishevar | A63F 13/77 |
| | | | | 709/220 |
| 2014/0073276 | A1* | 3/2014 | Iyer | H04H 60/66 |
| | | | | 455/179.1 |

FOREIGN PATENT DOCUMENTS

| | | |
|---|---|---|
| JP | 2008136210 A | 6/2008 |
| JP | 2016103216 A | 6/2016 |
| JP | 2016178577 A | 10/2016 |
| KR | 20120125766 A | 11/2012 |

\* cited by examiner

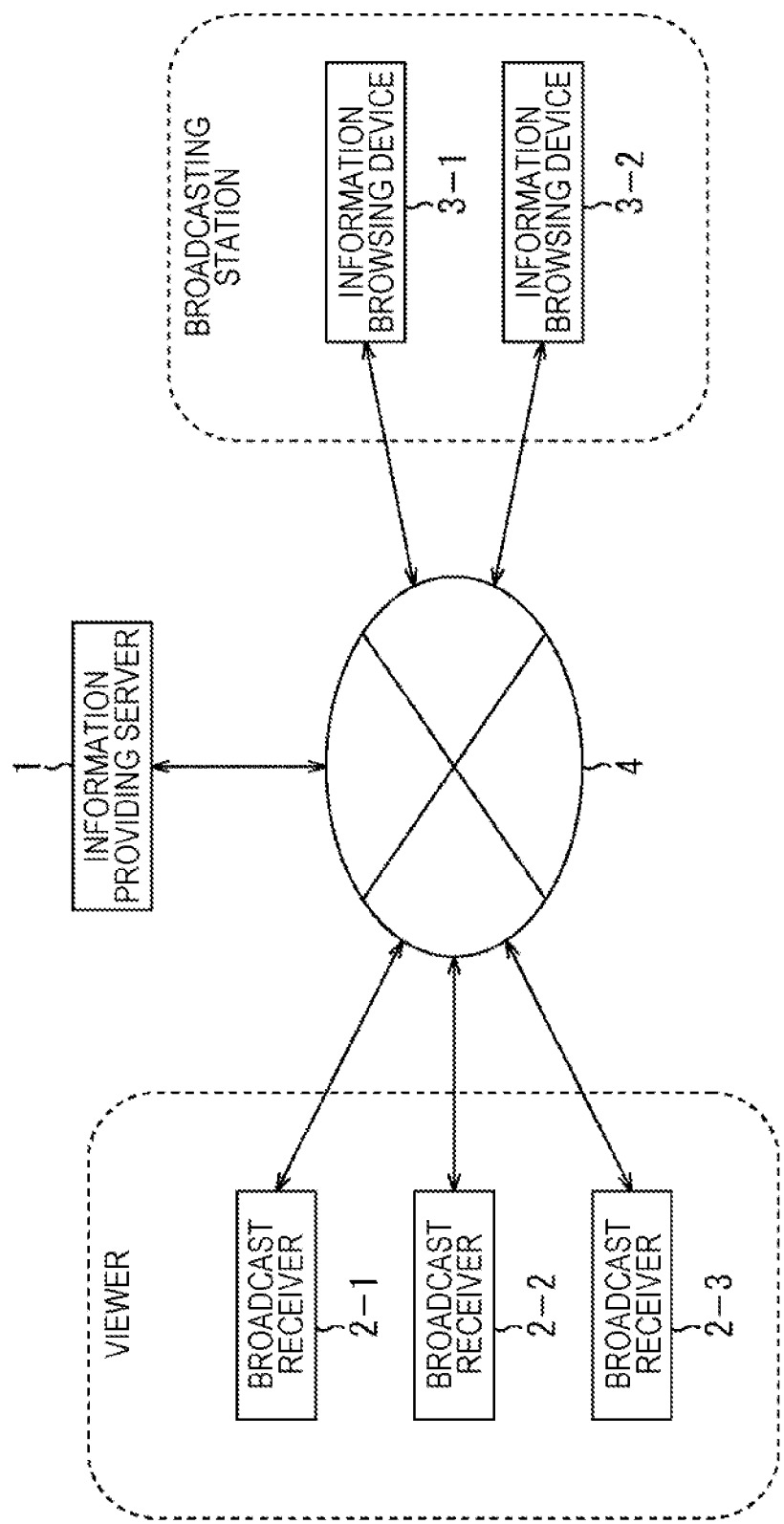

FIG. 2

| | | |
|---|---|---|
| 2016-09-12 | 20:58:40 | THERE WILL BE RAIN IN A WIDE AREA TOMORROW. HERE ARE |
| 2016-09-12 | 20:58:44 | THE RAIN FORECAST DETAILS. TONIGHT, THERE WILL BE A CONTINUED RAIN |
| 2016-09-12 | 20:58:47 | IN SOME AREAS, AND THE RAIN AREA WILL LIKELY SPREAD GRADUALLY TOMORROW. |
| 2016-09-12 | 20:58:52 | TOMORROW MORNING, THERE WILL BE RAIN IN A WIDE AREA AROUND COMMUTING TIME, TURNING IN A STEADY |
| 2016-09-12 | 20:58:56 | RAIN. MOREOVER, ACTIVE RAIN CLOUDS ARE FORECAST |
| 2016-09-12 | 20:59:00 | DAYTIME THEREAFTER, SO PLEASE BE CAREFUL FOR RAIN SITUATIONS. |
| 2016-09-12 | 20:59:03 | NOW, LOOK INTO LOCAL FORECASTS. |
| 2016-09-12 | 21:00:21 | >> GOOD EVENING. NEWS × × ×. |
| 2016-09-12 | 21:00:24 | >> WE ARE BEGINNING WITH EARTHQUAKE NEWS. >> TODAY, THERE WAS AN |
| 2016-09-12 | 21:00:28 | EARTHQUAKE CENTERED IN SOUTHERN KOREA AT ABOUT 8:32 PM |
| 2016-09-12 | 21:00:32 | AND A SHAKER REGISTERING A SEISMIC INTENSITY SCALE 3 WAS OBSERVED IN NAGASAKI PREFECTURE. |
| 2016-09-12 | 21:00:37 | A TSUNAMI IS NOT EXPECTED FROM THIS EARTHQUAKE. |
| 2016-09-12 | 21:00:40 | THE SEISMIC INTENSITY SCALE 3 WAS OBSERVED IN TSUSHIMA CITY IN NAGASAKI PREFECTURE. |
| 2016-09-12 | 21:00:44 | IN OTHER AREAS, SHAKERS REGISTERING SEISMIC INTENSITY SCALES 2 AND 1 WERE OBSERVED IN VARIOUS LOCATIONS |
| 2016-09-12 | 21:00:48 | IN NORTHERN KYUSHU AND CHUGOKU REGION. ACCORDING TO THE OBSERVATION OF THE METEOROLOGICAL AGENCY, |
| 2016-09-12 | 21:00:52 | IT IS ESTIMATED THAT THE EARTHQUAKE CENTER WAS LOCATED IN THE SOUTHERN KOREAN PENINSULA, |
| 2016-09-12 | 21:00:54 | THE DEPTH OF THE FOCUS WAS 10 KILOMETERS, AND |
| 2016-09-12 | 21:00:58 | THE MAGNITUDE INDICATING THE SCALE OF THE EARTHQUAKE WAS 5.7. |

FIG. 4

INFORMATION PROCESSING APPARATUS, INFORMATION PROCESSING METHOD, AND PROGRAM

CROSS-REFERENCE TO RELATED APPLICATIONS

This application is a national phase entry under 35 U.S.C. § 371 of International Application No. PCT/JP2017/038471 filed Oct. 25, 2017, which claims the priority from Japanese Patent Application No. 2016-218151 filed in the Japanese Patent Office on Nov. 8, 2016, the entire contents of which are hereby incorporated by reference.

TECHNICAL FIELD

The present technology relates to an information processing apparatus, an information processing method, and a program, and more particularly, to an information processing apparatus, an information processing method, and a program that make it possible to easily confirm a change in a viewing state and details at each time of a content item.

BACKGROUND ART

There is an audience rating as an index indicating how many households and people are watching programs and commercials. In addition to the average audience rating and the highest audience rating in the entire time zone of a program or a commercial, the audience rating has an audience rating per unit time such as one minute.

For example, from a standpoint of a broadcasting station, by seeing a change in the audience rating per unit time, it becomes possible to grasp which time zone was particularly focused on, in a program or a commercial.

CITATION LIST

Patent Document

Patent Document 1: Japanese Patent Application Laid-Open No. 2008-136210

SUMMARY OF THE INVENTION

Problems to be Solved by the Invention

The audience rating per unit time is used as a reference, for example, for organizing programs. Therefore, for example, in the case of displaying the audience rating per unit time as a graph, it is more preferable that even details in each time zone be allowed to be confirmed together with a change in the audience rating.

The present technology has been made in view of such a situation and is intended to make it possible to easily confirm a change in a viewing state and details at each time of a content item.

Solutions to Problems

An information processing apparatus according to an embodiment of the present technology includes: a viewing log acquiring unit that acquires a viewing log of a content item including at least one of a moving image or a sound; an acquiring unit that acquires display data representing details of the content item at each time; and a display control unit that displays a chart representing a transition of a viewing state of the content item specified on the basis of the viewing log, and the display data representing details of the content item at each time in a time zone for which the transition of the viewing state is represented by the chart, on a screen that is one and the same.

The acquiring unit can be caused to acquire data of a subtitle displayed in accordance with the moving image of the content item as the display data.

The display control unit can be caused to display a graph representing the transition of the viewing state as the chart, and to display at least a part of the subtitle at a time corresponding to each plot position in the vicinity of each plot position.

A subtitle analyzing unit that analyzes the subtitle and extracts a keyword can be further provided. In this case, the display control unit can be caused to display the keyword extracted from the subtitle at a time corresponding to each plot position.

The display control unit can be caused to arrange the subtitles in a display order and display the arranged subtitles in a second display area constituting the screen, the second display area being different from a first display area which is a display area of the chart.

A precise information acquiring unit that acquires precise information regarding the content item can be further provided. In this case, the display control unit can be caused to display the precise information in a third display area constituting the screen.

The display control unit can be caused to display a graph for each of a plurality of providers, the graph representing the transition of the viewing state of the content item provided by each provider in line with a schedule defined in advance.

The display control unit can be caused to display at least a part of the subtitle in the vicinity of each plot position on the graph of a predetermined provider selected from among the providers by a person browsing the screen.

The display control unit can be caused to display at least a part of the subtitle in the vicinity of a plot position having a highest value representing the viewing state, among plot positions at each time on the graphs of the plurality of providers.

The display control unit can be caused to display the chart by switching a unit time for representing the transition of the viewing state according to an operation by a person browsing the screen.

The display control unit can be caused to transmit data of the screen to an external device connected via a network and to display the screen on a display of the external device.

The viewing log acquiring unit can be caused to acquire the viewing log transmitted from a receiver configured to receive and reproduce the content item and used by a viewer of the content item.

The acquiring unit can be caused to acquire data of the subtitle extracted from the content item by a receiver configured to receive the content item and transmitted from the receiver.

According to an aspect of the present technology, a viewing log of a content item including at least one of a moving image or a sound is acquired and display data representing details of the content item at each time is acquired. Furthermore, a chart representing a transition of a viewing state of the content item specified on the basis of the viewing log, and the display data representing details of the content item at each time in a time zone for which the transition of the viewing state is represented by the chart are displayed on a screen that is one and the same.

Effects of the Invention

According to the present technology, it is possible to easily confirm a change in a viewing state and details at each time of a content item.

Note that the effects described herein are not necessarily limited and any effects described in the present disclosure may be applied.

BRIEF DESCRIPTION OF DRAWINGS

FIG. 1 is a diagram illustrating a configuration example of an information providing system according to an embodiment of the present technology.

FIG. 2 is a diagram illustrating an example of subtitle data.

FIG. 4 is a diagram illustrating a display example of the monitoring screen.

MODE FOR CARRYING OUT THE INVENTION

Figure 3:
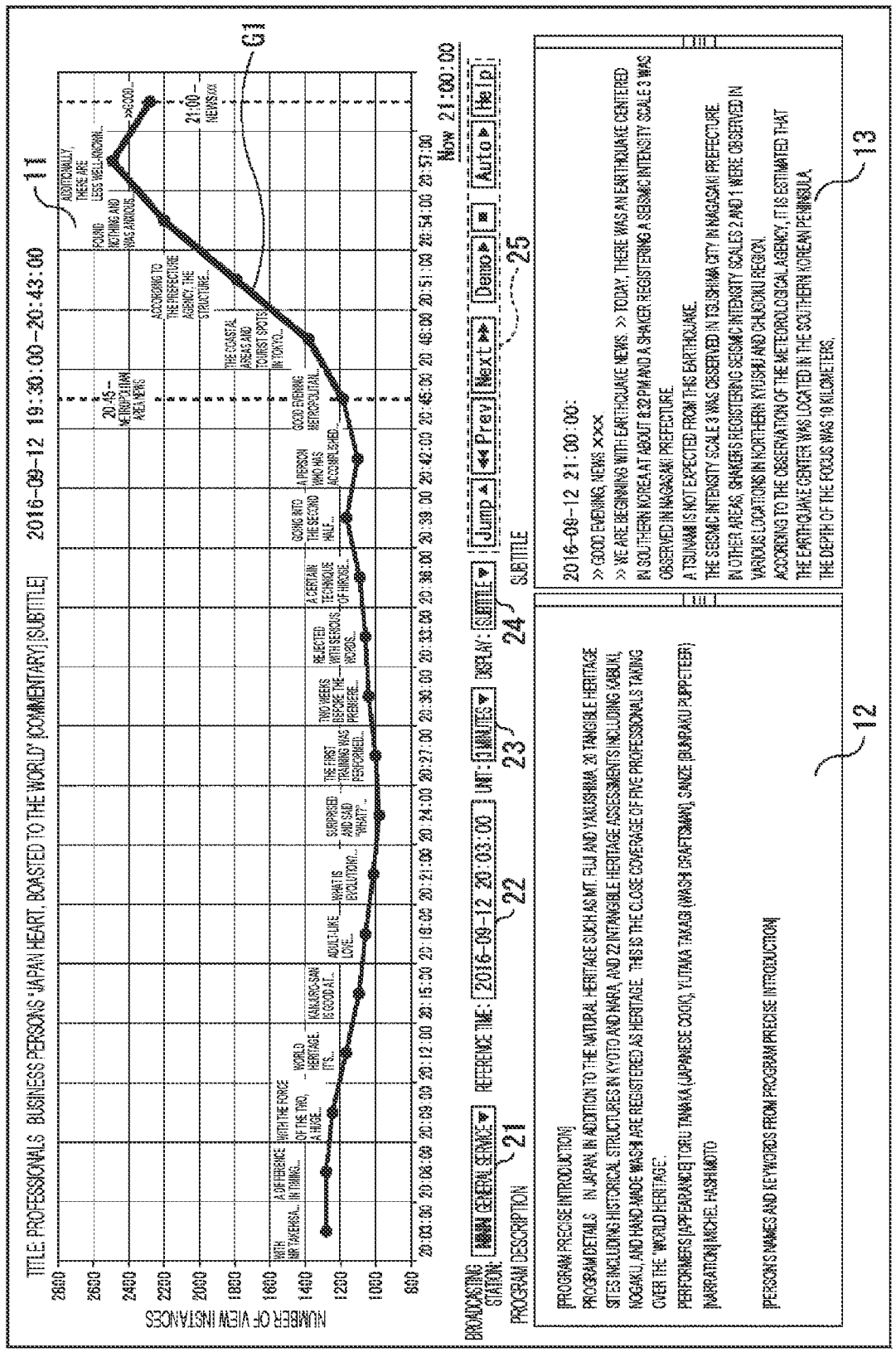
FIG. 3 is a diagram illustrating a display example of a monitoring screen.

Hereinafter, modes for carrying out the present technology will be described. The description will be given in the following order.

1. First Embodiment (an example in which a subtitle is extracted on a server side)
2. Second Embodiment (an example in which a subtitle is extracted on a receiver side)
3. Variations

1. First Embodiment (An Example in which a Subtitle is Extracted on a Server Side)

<1-1. Configuration Example of Information Providing System>

FIG. 1 is a diagram illustrating a configuration example of an information providing system according to an embodiment of the present technology.

The information providing system in FIG. 1 is a system that makes it possible for a business entity such as a broadcasting station to browse a viewing state of a content item including a moving image and a sound, such as a program and a commercial, in near real time. The information providing system in FIG. 1 can be said to be a monitoring system enabling monitoring of the viewing state of the content item.

The real-time browsing mentioned here means that the viewing state of a program with a predetermined time duration, such as an hour program, can be browsed while the program is being provided. A predetermined time difference equivalent to an amount required for aggregating viewing logs or the like is expected until the viewing state at a specific time is allowed to be browsed after details of a program at the specific time is provided.

Note that, in the following description, a case where a broadcasting station monitors the viewing state of a program to be provided in line with a schedule defined in advance will be mainly explained; however, the present technology can also be applied to monitoring of the viewing state of a content item made up of the moving image and sound, other than the program. The program may be provided via a transmission path using communication such as the Internet as well as the transmission path using the broadcast wave.

The information processing system in FIG. 1 is constituted by connecting an information providing server 1, broadcast receivers 2-1 to 2-3, and information browsing devices 3-1 and 3-2 via a network 4 such as the Internet.

The network 4 may be in any form of a wired network, a wireless network, or a network combining wired and wireless networks. Each of the broadcast receivers 2-1 to 2-3 and the information browsing devices 3-1 and 3-2 can communicate with the information providing server 1 via the network 4.

The broadcast receivers 2-1 to 2-3 are devices that can receive programs provided by broadcasting stations, such as television receivers, video recording instruments, and personal computers (PCs). Viewer, who are users of the broadcast receivers 2-1 to 2-3, for example, select a predetermined channel to view a program received and reproduced by the broadcast receivers 2-1 to 2-3.

During the viewing of the program, each of the broadcast receivers 2-1 to 2-3 transmits a viewing log to the information providing server 1. The viewing log includes, for example, time information in addition to identification information such as a channel number representing a channel being received and a program ID indicating a program being viewed.

The broadcast receivers 2-1 to 2-3 are equipped with an application that repeatedly transmits the viewing log at predetermined time intervals. This application is provided by, for example, a business entity managing the information providing server 1.

The information browsing devices 3-1 and 3-2 are information processing devices equipped with a web browser, such as PCs, tablet terminals, and smartphones. For example, the information browsing devices 3-1 and 3-2 are prepared in broadcasting stations different from each other and handled by administrators at respective broadcasting station. The administrators at the broadcasting stations operate the information browsing devices 3-1 and 3-2 to access a website managed by the information providing server 1, and each browse the viewing state of a program provided by the own broadcasting station and the viewing state of a program provided by the other station.

In the example in FIG. 1, three devices, namely, the broadcast receivers 2-1 to 2-3, are illustrated as broadcast receivers used for viewing programs, but actually a greater number of broadcast receivers are connected to the network 4. Similarly, although two devices, namely, the information browsing devices 3-1 and 3-2, are illustrated as information browsing devices used for monitoring the viewing state, actually a greater number of information browsing devices are connected to the network 4.

Hereinafter, in a case where it is not necessary to distinguish the broadcast receivers 2-1 to 2-3 from each other, the broadcast receivers 2-1 to 2-3 are collectively referred to as broadcast receivers 2 as appropriate. Furthermore, in a case where it is not necessary to distinguish the information browsing devices 3-1 and 3-2 from each other, the information browsing devices 3-1 and 3-2 are collectively referred to as information browsing devices 3.

The information providing server 1 is, for example, a server managed by a manufacturer of the broadcast receiver 2. The information providing server 1 receives the viewing log transmitted from the broadcast receiver 2 and aggregates the viewing state of each program being broadcast.

The viewing state of the program is represented by, for example, the number of view instances, which is the number of viewers who are viewing the program. The audience rating may be worked out from the number of viewers relative to the total number of viewers such that the viewing state is represented by the audience rating. In this manner, the value representing the viewing state is arbitrary as long as the value is worked out on the basis of the viewing log.

Furthermore, the information providing server 1 receives a program being provided by each broadcasting station and extracts subtitle data of each program. In this example, the information providing server 1 also has a function as the broadcast receiver.

FIG. 2 is a diagram illustrating an example of the subtitle data.

As illustrated in FIG. 2, the subtitle data is constituted by associating text data with display time. The subtitle data illustrated in FIG. 2 is subtitle data of a certain program broadcast on "Sep. 12, 2016" and, for example, assumes that the subtitle ">> Good evening, News xxx." is displayed at 21 seconds after 21:00 o'clock ("21:00:21").

The information providing server 1 generates, as a monitoring screen used for browsing the viewing state of the program, a screen displaying a subtitle at each time of the program, together with a graph representing a transition of (time series changes in) the number of view instances of the program. The information providing server 1 displays the monitoring screen thus generated on a display of the information browsing device 3 that has accessed the information providing server 1.

<1-2. About Screen Display>

FIG. 3 is a diagram illustrating a display example of the monitoring screen.

Basically, the monitoring screen is constituted by a viewing state display field 11, which is a horizontally long rectangular display area, formed in approximately an upper half of the monitoring screen, and a program precise display field 12 and a subtitle display field 13 formed in a lower part. A broadcasting station selection field 21, a time display field 22, a unit time selection field 23, a display format selection field 24, and operation buttons 25 are arranged side by side and displayed under the viewing state display field 11.

The operation on the monitoring screen is performed, for example, using a mouse provided in the information browsing device 3 or, in a case where a touch panel is provided on the display of the information browsing device 3, by touching the screen directly.

A view instance count graph G1, which is a line graph representing a change in the number of view instances of a program provided by a certain broadcasting station, is displayed in the viewing state display field 11. The horizontal axis of the viewing state display field 11 represents time and the vertical axis thereof represents the number of view instances. The number of view instances of the program is obtained by aggregating viewing logs transmitted from the broadcast receivers 2.

In the example in FIG. 3, "NNN General Service" is selected as a broadcasting station and "3 minutes" is selected as a unit time. With "20:03:00" as a left end and "21:00:00", which is the current time, as a right end, the view instance count graph G1 in the viewing state display field 11 indicates the number of view instances of a program broadcast by "NNN General Service" at each time at three-minute intervals in a time zone from "20:03:00" to "21:00:00".

The display in the viewing state display field 11 is updated every unit time such that the number of view instances at the current time aggregated immediately before is always displayed at the right end. Accordingly, the displayed number of view instances at each time in the view instance count graph G1 illustrated in FIG. 3 is slid to the left.

Since the view instance count graph G1 is displayed while being updated, the administrator of the information browsing device 3 can confirm a change in the number of view instances of the selected broadcasting station in real time.

Furthermore, at least a part of a subtitle displayed at a time correlated with each plot position is displayed in the vicinity of each plot position representing the number of view instances in the viewing state display field 11. As described earlier, the information providing server 1 is designed to extract the subtitle data from data of each program and the subtitle is displayed on the monitoring screen using the extracted subtitle data.

For example, the letters ">> Good . . . " are displayed above the plot position of "21:00:00" at the right end. These letters coincide with a head portion of ">> Good evening, News xxx." described with reference to FIG. 2, which is a subtitle at "21:00:21" directly before the current time.

Each letter displayed above the other plot positions also represents a part of a subtitle displayed at a time corresponding to each plot position or during a unit time including that time. There is a restriction on the number of letters to be displayed and letters that cannot be displayed are represented by " . . . ".

Figure 4:
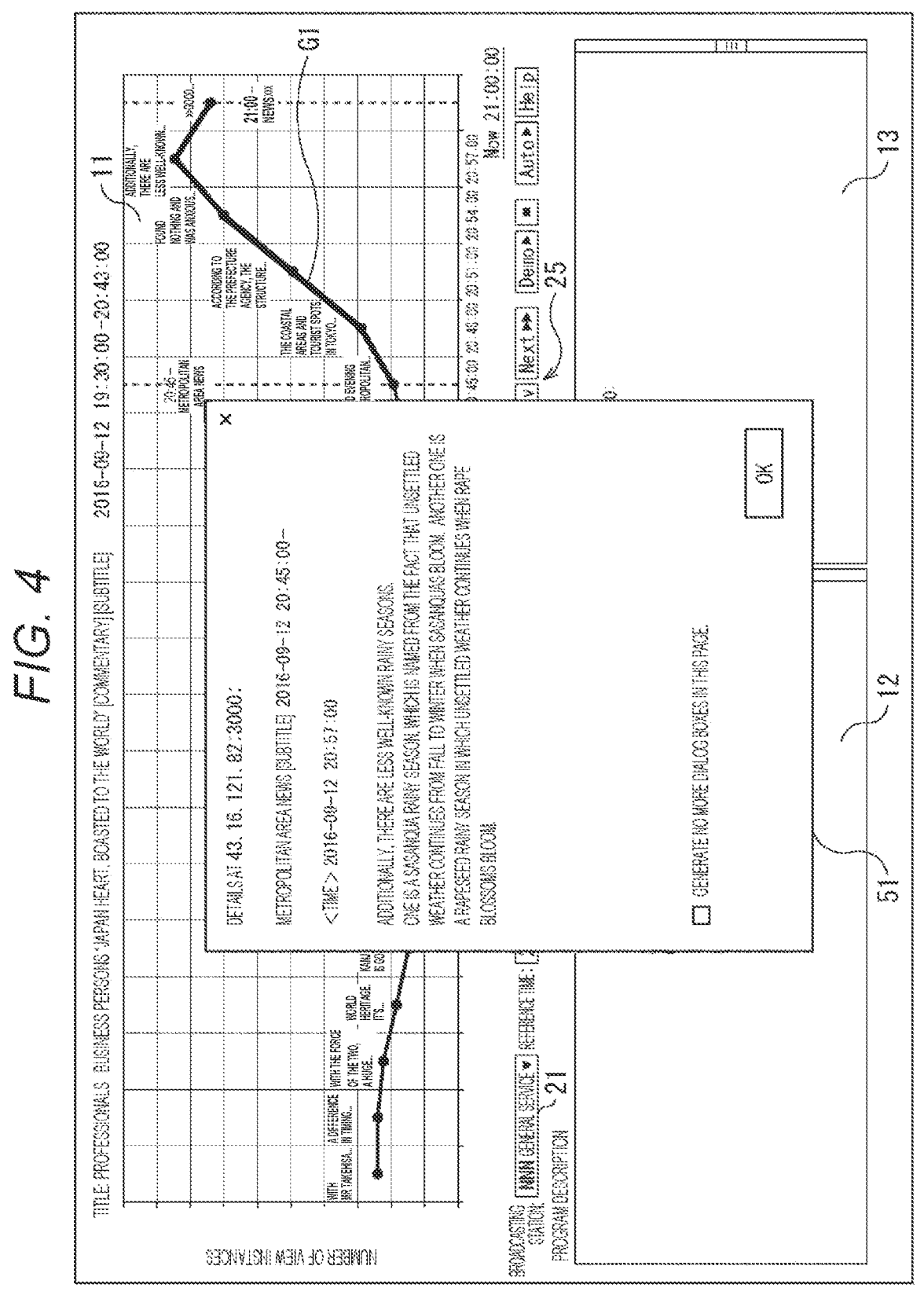

For example, in a case where a subtitle displayed at a plot position or in the vicinity of a plot position is pressed, a pop-up window 51 is displayed overlapping on the monitoring screen, as illustrated in FIG. 4. A subtitle displayed at a time corresponding to the pressed position (a subtitle within a unit time including the corresponding time) is displayed in the window 51, including the letters that cannot be displayed on the viewing state display field 11. Note that, in a case where the subtitle is pressed, the display of the subtitle display field 13 is updated such that the subtitle corresponding to the pressed time is displayed at an uppermost row.

The subtitle "Additionally, there are less well-known . . . " displayed in the window 51 in FIG. 4 is a subtitle at "20:57:00" displayed when a subtitle displayed in the vicinity of the plot position of "20:57:00" or above this plot position in the viewing state display field 11 is pressed.

In this manner, since the view instance count graph G1 is displayed in a form with the subtitle at each time added, the administrator of the information browsing device 3 can confirm not only the number of view instances at each time but also rough details at each time.

Figure 5:
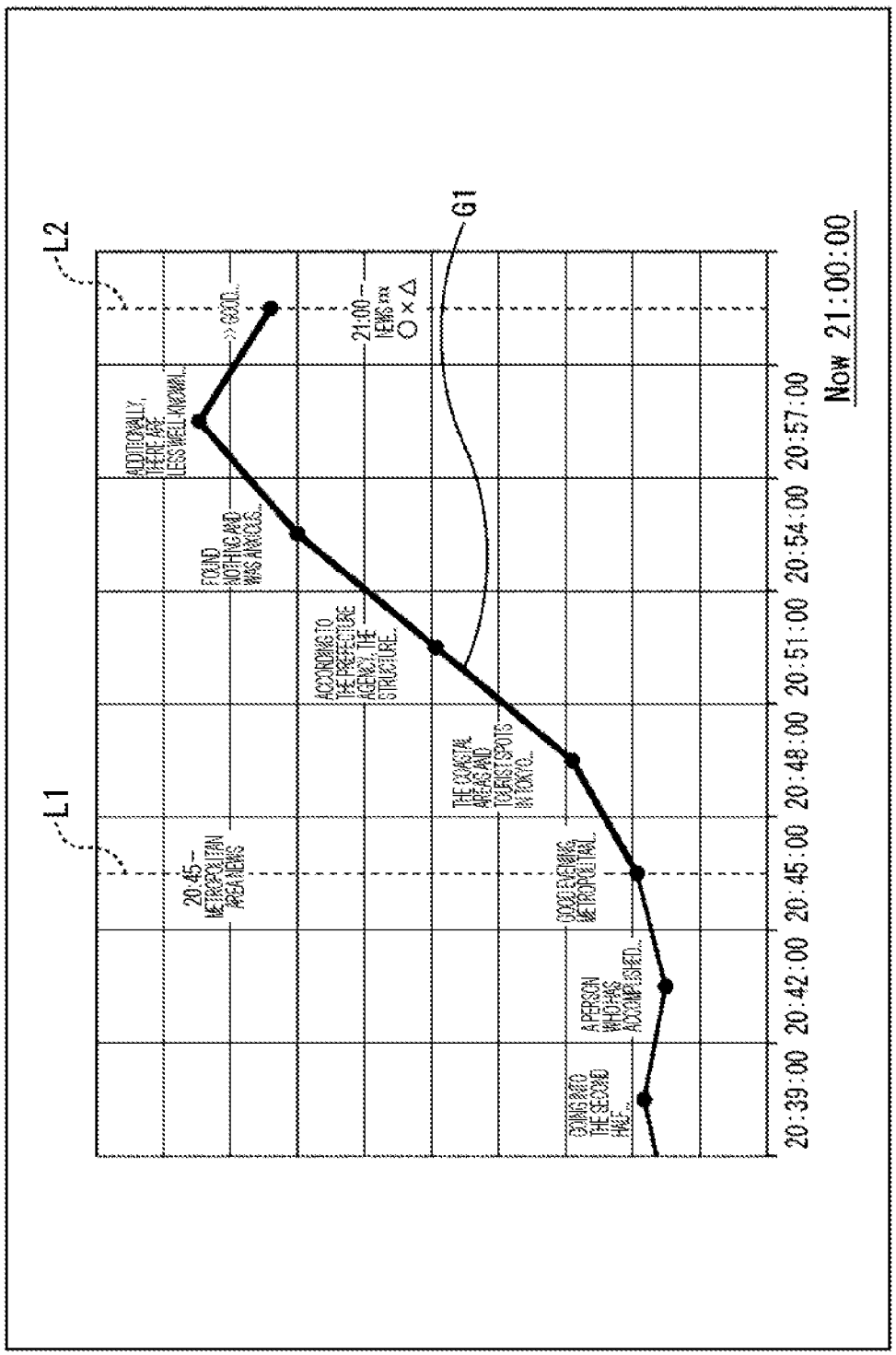
FIG. 5 is an enlarged diagram illustrating a part of the monitoring screen.

FIG. 5 is an enlarged diagram illustrating the vicinity of the right end of the viewing state display field 11 in FIG. 3.

In the example in FIG. 5, the number of view instances in a time zone from "20:39:00" to "21:00:00" is illustrated. A part of a subtitle displayed at each time is displayed above each plot position.

A boundary line L1 and a boundary line L2 indicated by broken lines are lines actually displayed in the viewing state display field 11 and indicate the timing of program switching. For example, the boundary line L1 displayed at the position of "20:45:00" indicates the start time of a program with the program name "Metropolitan Area News", while the broken line L2 displayed at the position of "21:00:00" indicates the start time of a program with the program name "News xxx". At a predetermined position on the boundary lines L1 and L2, the program name of a program started at a time correlated with the predetermined position is displayed superimposed on the boundary line.

Furthermore, lines constituting the view instance count graph G1 are displayed using different lines for each program. In FIG. 5, a line of the view instance count graph G1 after "20:45:00" indicated by the boundary line L1 is indicated by a thicker line than a line for a time period earlier than that time, which means that lines different from each other are used for display. For example, the number of view instances is represented by changing the type, color, thickness, and the like of the line for each program. A line representing the number of view instances of a program being broadcast may be emphatically displayed.

Returning to the explanation of FIG. 3, the name of the currently selected broadcasting station is displayed in the broadcasting station selection field 21. The view instance count graph G1 representing the number of view instances of a program of the broadcasting station displayed in the broadcasting station selection field 21 is displayed in the viewing state display field 11.

The administrator of the information browsing device 3 can select a predetermined broadcasting station from a list of broadcasting stations displayed when a downward triangle at the right end of the broadcasting station selection field 21 is pressed and display the view instance count graph representing the audience rating of a program of the selected broadcasting station in the viewing state display field 11.

A reference time is displayed in the time display field 22. The reference time is set, for example, by pressing a position on the viewing state display field 11 and a time corresponding to the pressed position is set as the reference time. For example, the display of the viewing state display field 11 is controlled such that the number of view instances at the reference time is displayed at the left end.

Note that the title and the broadcasting time of the program displayed above the viewing state display field 11 are information regarding a program broadcast at the reference time.

The currently selected unit time is displayed in the unit time selection field 23. The view instance count graph G1 representing the number of view instances per unit time displayed in the unit time selection field 23 is displayed in the viewing state display field 11.

The administrator of the information browsing device 3 can select a predetermined unit time out of a plurality of unit times such as "1 minute", "3 minutes", and "5 minutes" displayed when a downward triangle at the right end of the unit time selection field 23 is pressed and set the granularity of change in the number of view instances.

The currently selected display mode is displayed in the display format selection field 24. For example, a subtitle mode and a keyword mode are prepared for the display mode.

The subtitle mode is a mode in which a subtitle at each time is displayed in the vicinity of each plot position in the viewing state display field 11 as it is by a predetermined number of letters in order from the first letter. Meanwhile, the keyword mode is a mode in which a keyword extracted by analyzing the subtitle is displayed in the vicinity of each plot position in the viewing state display field 11.

The administrator of the information browsing device 3 can press a downward triangle at the right end of the display format selection field 24 and select one display mode out of the subtitle mode and the keyword mode. FIG. 3 illustrates an example of the monitoring screen while the subtitle mode is set.

The operation buttons 25 are constituted by a plurality of buttons such as a button operated to switch the time zone of the viewing state display field 11. In FIG. 3, a broken line surrounding the operation buttons 25 is not a line actually displayed.

Precise information regarding a program broadcast at the reference time is displayed in the program precise display field 12 in the lower part of the monitoring screen. The precise information displayed in the program precise display field 12 is information acquired, for example, from service information (SI) such as an electronic program guide (EPG), program listing data for the Internet, or the like, and includes information regarding details, performers, keywords, and the like of the program.

In the subtitle display field 13, the subtitles are arranged in the display order and displayed collectively for each subtitle displayed during the unit time. The display of the subtitle display field 13 is updated with the lapse of time such that, for example, a subtitle during a unit time including the current time is displayed at the uppermost row. Subtitles during unit times earlier than the unit time including the current time are placed in a lower portion of the subtitle display field 13.

In the example in FIG. 3, subtitles including ">> Good evening, News xxx.", which is the subtitle at "21:00:00", which is the current time, are displayed. The administrator of the information browsing device 3 can confirm, from the display of the subtitle display field 13, precise text of the subtitle that is only partially displayed in the viewing state display field 11.

As described above, on the monitoring screen provided by the information providing server 1, subtitles of the program are displayed as additional information for the view instance count graph representing a change in the number of view instances.

The subtitle represents the details of the program at each time; accordingly, for example, in a case where the number of view instances has changed greatly, the administrator of the information browsing device 3 can easily confirm the reason for the change from the subtitle. In a case where only a graph simply indicating a change in the number of view instances is displayed, even if there is a great change in the number of view instances, it is difficult to confirm the reason for the change unless the program is actually viewed; however, subtitles enable inference of reason.

Figure 6:
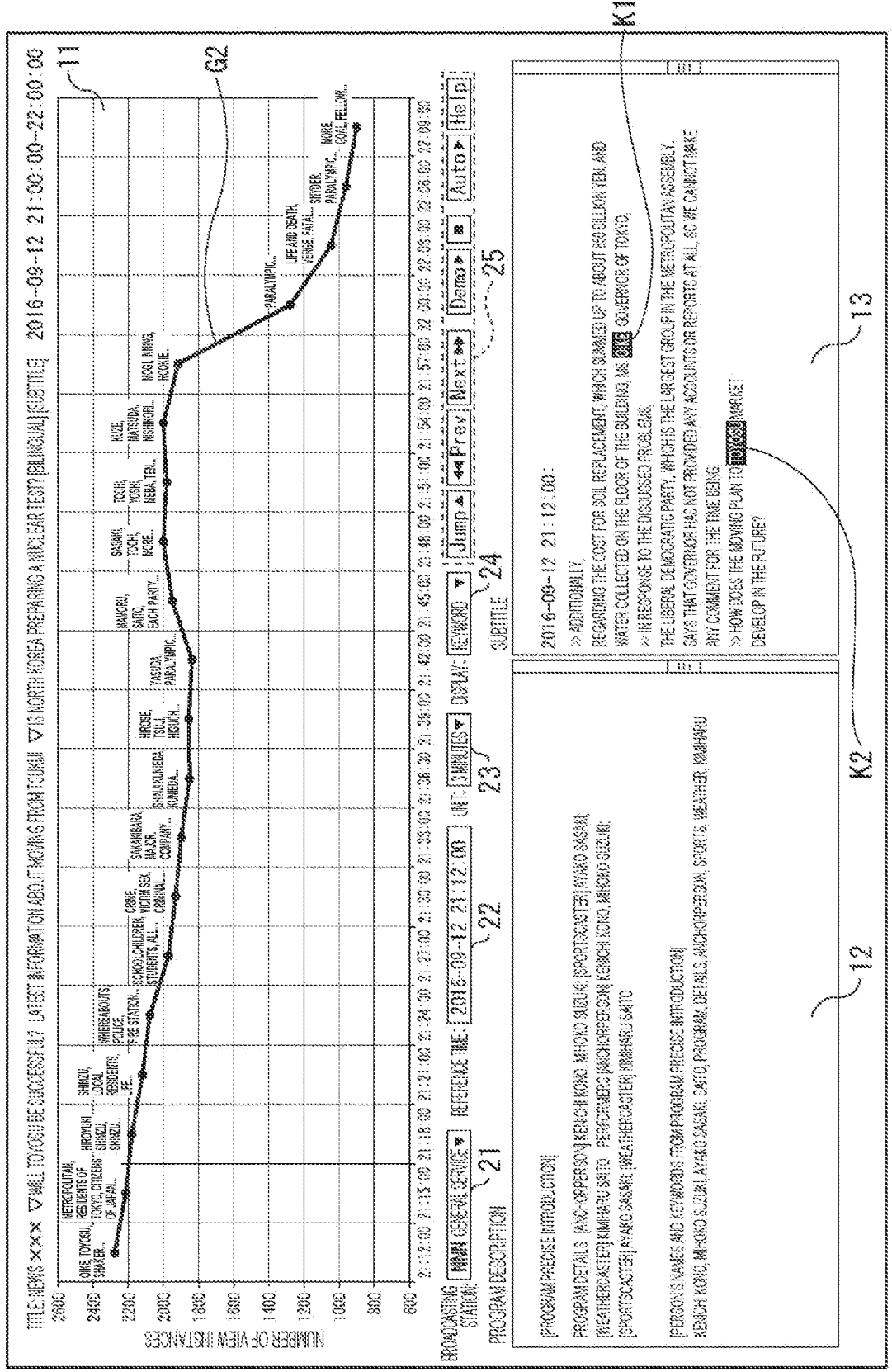
FIG. 6 is a diagram illustrating a display example of the monitoring screen.

FIG. 6 is a diagram illustrating an example of the monitoring screen while the keyword mode is set.

In FIG. 6, a view instance count graph G2 of a program broadcast by "NNN General Service" indicating the number of view instances at each time at three-minute intervals in a time zone from "21:12:00" to "22:09:00" is displayed in the viewing state display field 11. For example, the letters "Oike" and "Toyosu" are displayed above the plot position of "21:12:00" at the left end. "Oike" and "Toyosu" are keywords extracted from a subtitle during a unit time including "21:12:00".

Each letter displayed above the other plot positions also represents a keyword extracted from a subtitle displayed during a unit time including a time correlated with each plot position. Note that, among the extracted keywords, a keyword included in the program precise display field 12 may be emphatically displayed.

As described above, while the keyword mode is set, the subtitle is not displayed in order from the first letter, but the keyword extracted by analyzing the subtitle is displayed in the vicinity of each plot position in the viewing state display field 11.

With such a keyword, the administrator of the information browsing device 3 can more easily confirm the details of the program at each time.

While the keyword mode is set, a keyword included in the subtitle displayed in the subtitle display field 13 is emphatically displayed as illustrated in FIG. 6.

In FIG. 6, "Oike" indicated as a keyword K1 and "Toyosu" indicated as a keyword K2 are displayed with outlined letters, which means that the keywords K1 and K2 are emphatically displayed. Emphatic display is made by changing the color of a letter, adding an underline, changing the color of the background, and so on.

Keywords extracted from the subtitle may be arranged and displayed in the subtitle display field 13 together with the display time, instead of the entire subtitle within the unit time.

The process of the information providing server 1 to display the monitoring screen as described above will be described later with reference to a flowchart.

<1-3. Configuration and Action of Information Providing Server>

Configuration of Information Providing Server

Figure 7:
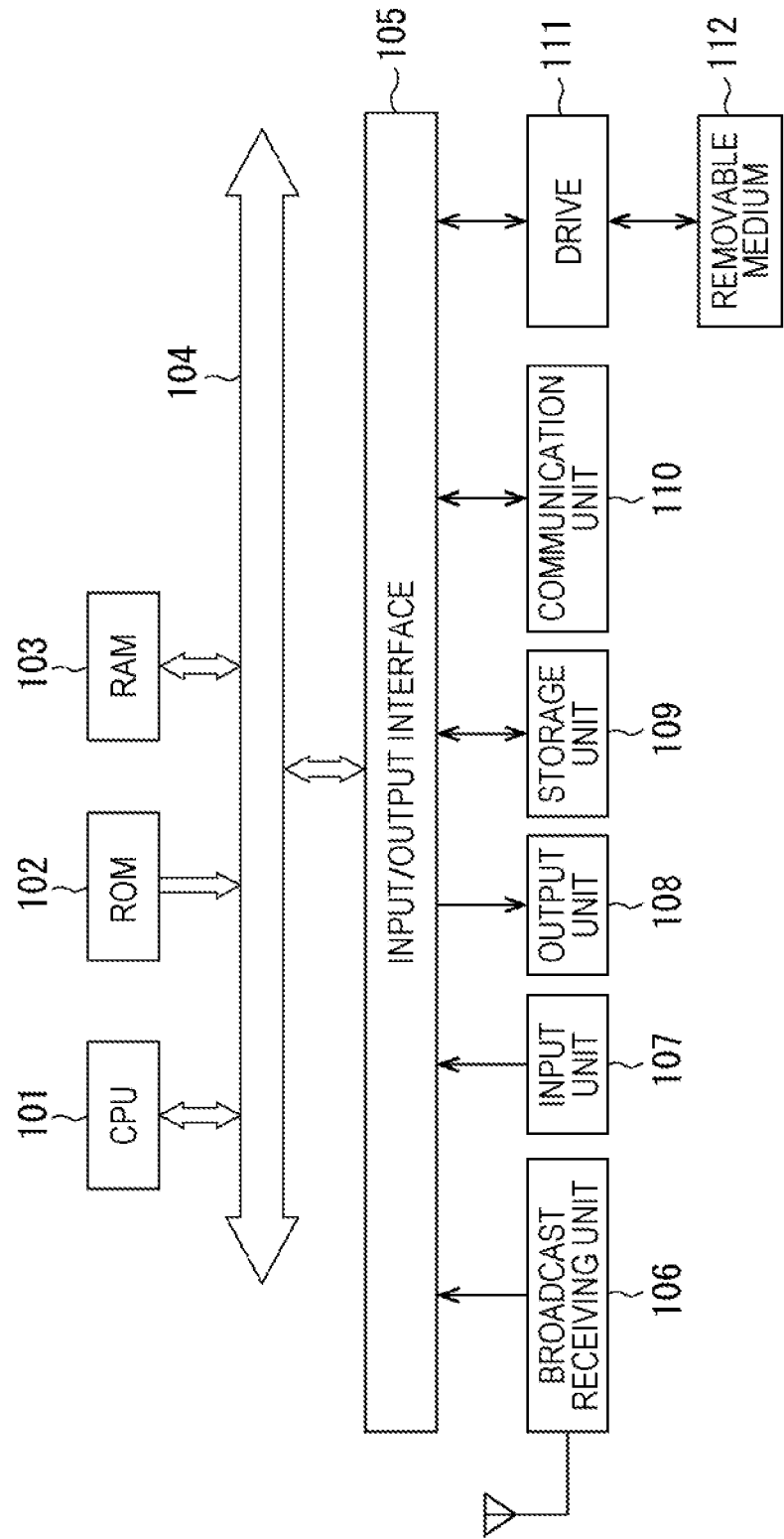
FIG. 7 is a block diagram illustrating an example of a hardware configuration of an information providing server.

FIG. 7 is a block diagram illustrating an example of a hardware configuration of the information providing server 1.

A central processing unit (CPU) 101, a read only memory (ROM) 102, and a random access memory (RAM) 103 are interconnected through a bus 104.

Moreover, an input/output interface 105 is connected to the bus 104. A broadcast receiving unit 106, an input unit 107, an output unit 108, a storage unit 109, a communication unit 110, and a drive 111 are connected to the input/output interface 105.

The broadcast receiving unit 106 receives a broadcast wave signal from an antenna (not illustrated) and outputs, for example, data of all programs being broadcast.

The input unit 107 is constituted by a keyboard, a mouse, and the like, and outputs a signal representing the details of an operation by an administrator of the information providing server 1.

The output unit 108 is constituted by a recording medium such as a hard disk or a nonvolatile memory and stores various types of data used for displaying the monitoring screen, such as the viewing log, the precise information regarding the program, and the subtitle data.

The communication unit 110 is constituted by a network interface and the like and communicates with the broadcast receiver 2 and the information browsing device 3. Furthermore, in a case where the program is provided via a transmission path for the communication, the communication unit 110 receives the data of a program transmitted from a server managed by a broadcasting station of the program.

The drive 111 writes data to a removable medium 112 or reads data stored in the removable medium 112.

Figure 8:
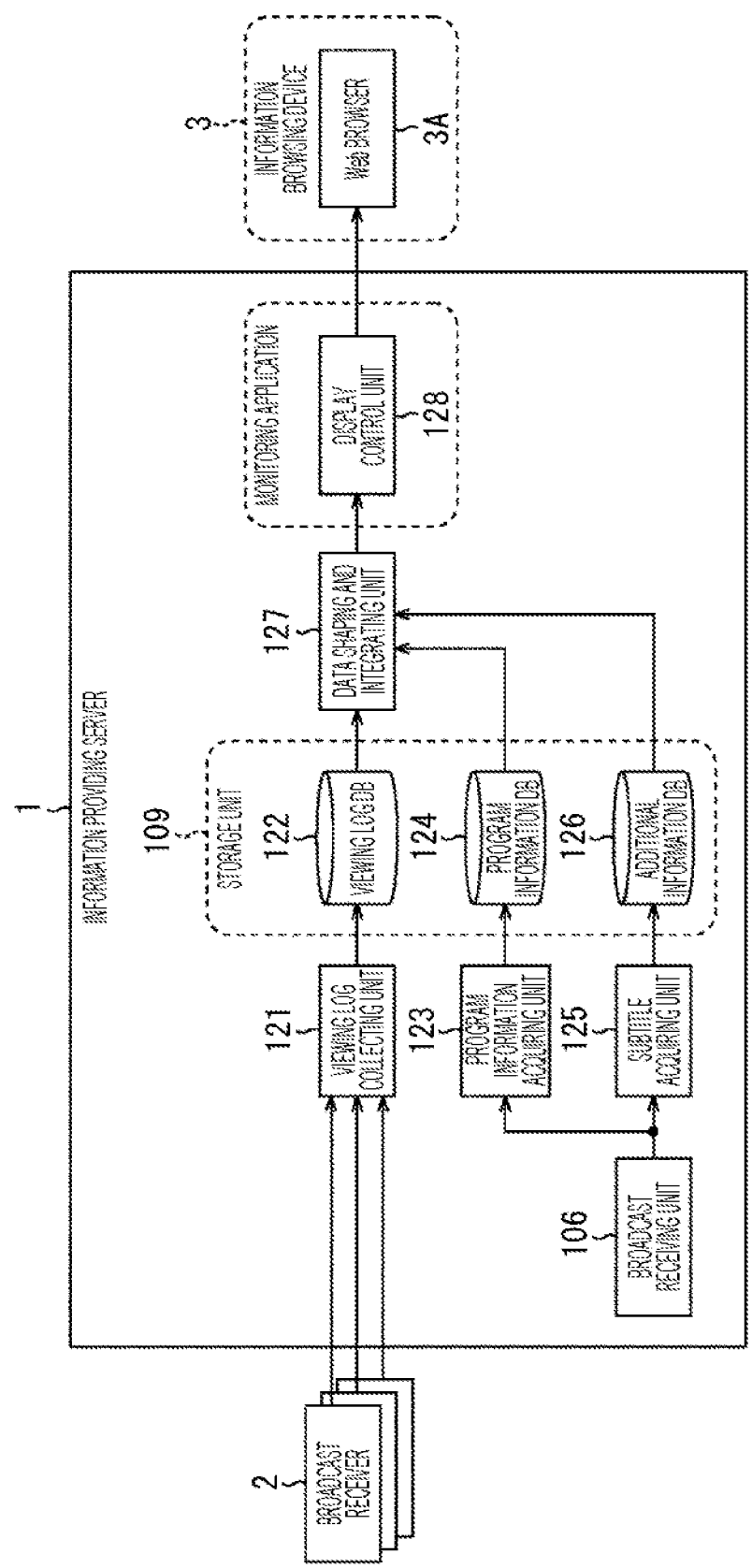
FIG. 8 is a block diagram illustrating a functional configuration example of the information providing server.

FIG. 8 is a block diagram illustrating a functional configuration example of the information providing server 1. At least a part of function units illustrated in FIG. 8 is realized by the CPU 101 in FIG. 7 executing a predetermined program.

In the information providing server 1, a viewing log collecting unit 121, a viewing log database (DB) 122, a program information acquiring unit 123, a program information DB 124, a subtitle acquiring unit 125, an additional information DB 126, a data shaping and integrating unit 127, and a display control unit 128 are realized. The viewing log DB 122, the program information DB 124, and the additional information DB 126 are realized in the storage unit 109.

The viewing log collecting unit 121 acquires the viewing log transmitted from the broadcast receiver 2 and received by the communication unit 110. The viewing log collecting unit 121 stores the acquired viewing log in the viewing log DB 122.

The program information acquiring unit 123 acquires program information added to program data supplied from the broadcast receiving unit 106. The program information includes the precise information such as the outline of the program and performers, as described earlier. The program information acquiring unit 123 functions as an acquiring unit that acquires the precise information regarding the program. The program information acquiring unit 123 stores the acquired program information in the program information DB 124.

The subtitle acquiring unit 125 extracts the subtitle data from the program data supplied from the broadcast receiving unit 106 and acquires the subtitle data. The subtitle data is text data representing the details of the program at each time. The subtitle acquiring unit 125 functions as an acquiring unit that acquires the text data representing the details of the program at each time. The subtitle acquiring unit 125 stores the subtitle data acquired from the program data in the additional information DB 126. The subtitle data of all broadcast programs is stored in the additional information DB 126.

Note that, in a case where the program is provided via the transmission path for the communication, the data of the program received by the communication unit 110 is supplied to the program information acquiring unit 123 and the subtitle acquiring unit 125. The program information acquiring unit 123 and the subtitle acquiring unit 125 perform processes similar to the respective processes on the program data provided via the transmission path for the broadcast wave, and acquire the program information and the subtitle data.

The data shaping and integrating unit 127 aggregates the viewing logs stored in the viewing log DB 122 and calculates the number of view instances of the program of each broadcasting station.

Furthermore, the data shaping and integrating unit 127 generates display data of the monitoring screen on the basis of the number of view instances of the program of each broadcasting station, the precise information regarding each program stored in the program information DB 124, and the subtitle data of each program stored in the additional information DB 126. The data shaping and integrating unit 127 outputs the generated display data of the monitoring screen to the display control unit 128.

The display control unit 128 controls the communication unit 110 to communicate with a web browser 3A of the information browsing device 3 and transmits the display data of the monitoring screen to the web browser 3A. The display control unit 128 is realized by the CPU 101 executing a monitoring application configured to control the display of the monitoring screen.

Figure 9:
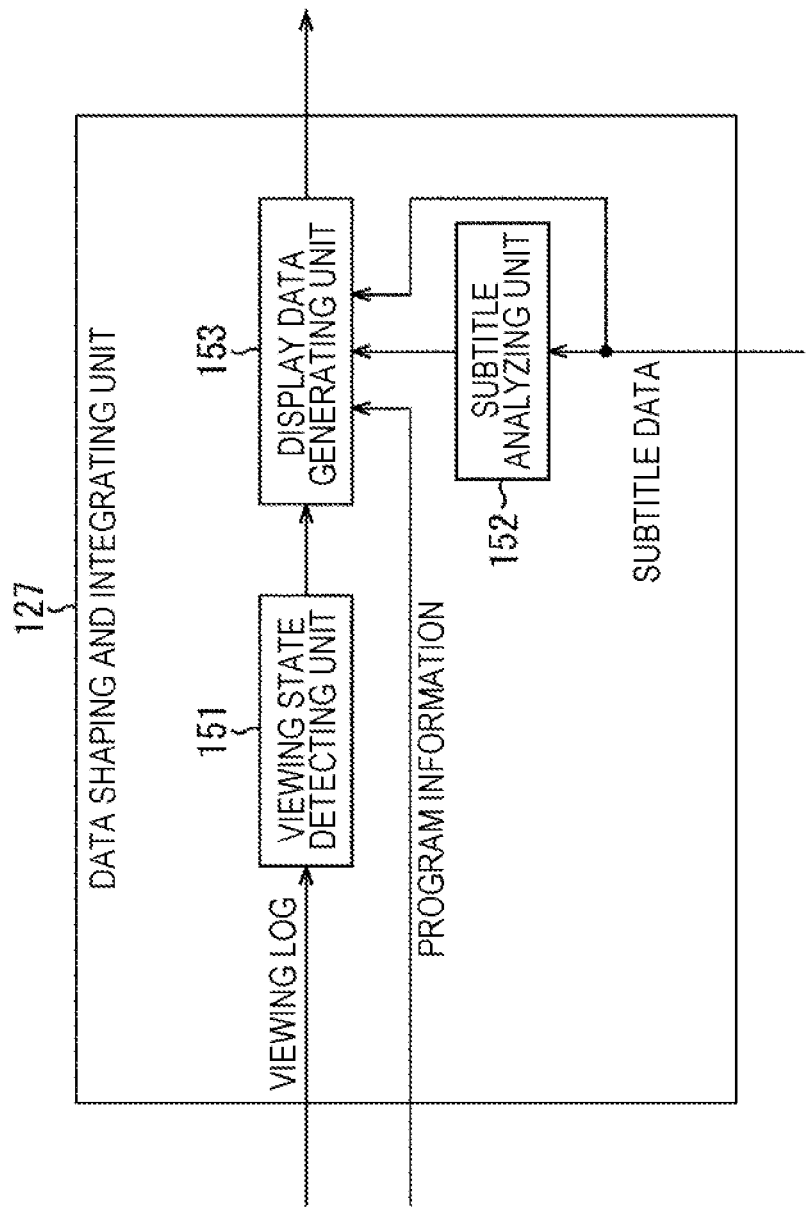
FIG. 9 is a block diagram illustrating a configuration example of a data shaping and integrating unit in FIG. 8.

FIG. 9 is a block diagram illustrating a configuration example of the data shaping and integrating unit 127.

The data shaping and integrating unit 127 is constituted by a viewing state detecting unit 151, a subtitle analyzing unit 152, and a display data generating unit 153. The viewing log read from the viewing log DB 122 is supplied to the viewing state detecting unit 151, while the program information read from the program information DB 124 is supplied to the display data generating unit 153. Furthermore, the subtitle data read from the additional information DB 126 is supplied to the subtitle analyzing unit 152 and the display data generating unit 153.

The viewing state detecting unit 151 aggregates the viewing logs read from the viewing log DB 122 and iteratively calculates the number of view instances of the program of each broadcasting station. For example, the number of view instances of all broadcast programs is calculated in real time by the viewing state detecting unit 151. The viewing state detecting unit 151 outputs information regarding the calculated number of view instances to the display data generating unit 153.

The subtitle analyzing unit 152 analyzes the subtitle data read from the additional information DB 126 and extracts a keyword from the subtitle at each time. The subtitle analyzing unit 152 outputs the extracted keyword to the display data generating unit 153, together with time information of each subtitle from which the keyword has been extracted. The keyword extracted by the subtitle analyzing unit 152 is used, for example, in a case where the keyword mode is set as the display mode of the monitoring screen.

The display data generating unit 153 associates the number of view instances, the program information, and the subtitle including the keyword at each time with each other by program of each broadcasting station to generate the display data of the monitoring screen, and outputs the generated display data to the display control unit 128.

Action of Information Providing Server

Here, the action of the information providing server 1 having the configuration as described above will be described with reference to the flowchart in FIG. 10.

In step S1, the viewing log collecting unit 121 acquires the viewing log transmitted from the broadcast receiver 2. The viewing log collection by the viewing log collecting unit 121 is repeatedly performed while the process in FIG. 10 is being performed.

In step S2, the viewing state detecting unit 151 of the data shaping and integrating unit 127 aggregates the viewing logs and calculates the number of view instances of the program of each broadcasting station.

In step S3, the program information acquiring unit 123 acquires the program information added to the program data received by the broadcast receiving unit 106.

In step S4, the subtitle acquiring unit 125 extracts the subtitle data from the program data received by the broadcast receiving unit 106 and acquires the subtitle data. The subtitle acquiring unit 125 acquires the subtitle data of all programs.

In step S5, the subtitle analyzing unit 152 analyzes the subtitle data of each program and extracts a keyword from the subtitle at each time.

In step S6, the display data generating unit 153 associates the number of view instances, the program information, and the subtitle including the keyword at each time with each other by program of each broadcasting station to generate the display data of the monitoring screen.

In step S7, the display control unit 128 transmits, to the information browsing device 3, the data of the monitoring screen in which the respective pieces of information, namely, the number of view instances, the program information, and the subtitle including the keyword at each time, are placed in line with the setting by the administrator of the information browsing device 3, and displays the monitoring screen.

The process in each step described thus far is repeatedly performed concurrently with, or before and after the processes in other steps as appropriate. The monitoring screen as described with reference to FIG. 3 or other drawings is displayed on the display of the information browsing device 3, whereby the administrator of the information browsing device 3 can confirm a change in the number of view instances of the program of a predetermined broadcasting station in real time, together with the details at each time.

2. Second Embodiment (An Example in which a Subtitle is Extracted on a Receiver Side)

In the above description, the subtitle to be displayed on the monitoring screen is extracted in the information providing server 1; however, the subtitle may be extracted in the broadcast receiver 2. The subtitle data extracted by the broadcast receiver 2 is transmitted to the information providing server 1 and used for displaying the monitoring screen.

Figure 11:
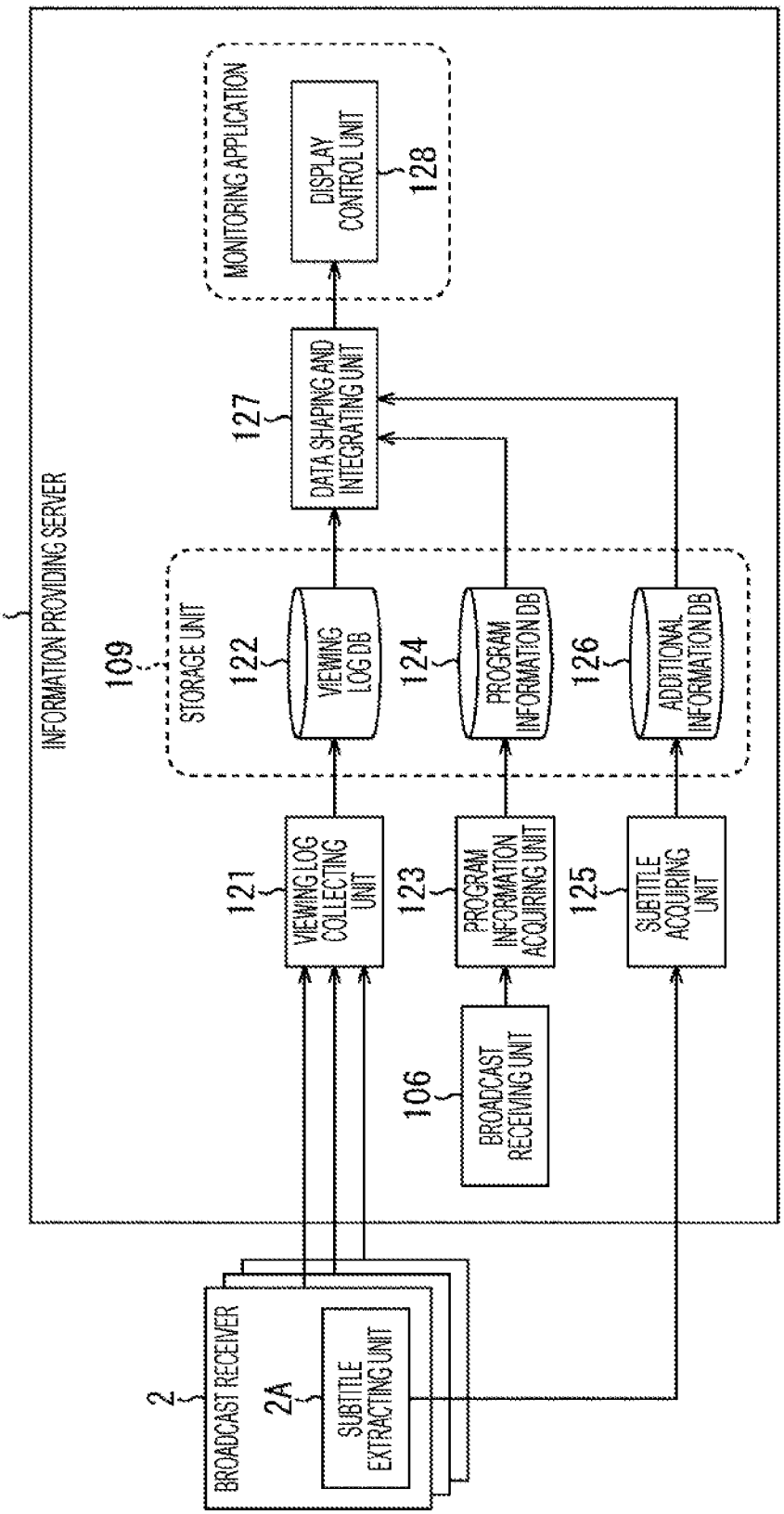
FIG. 11 is a diagram illustrating a configuration example of an information providing server.

FIG. 11 is a diagram illustrating a configuration example of an information providing server 1 in a case where the subtitle is extracted in a broadcast receiver 2.

In the configuration illustrated in FIG. 11, the same reference numerals are given to the same components as the components described with reference to FIG. 8. Duplicated description will be omitted as appropriate. This is similarly applicable to FIG. 12 and other drawings described later.

A subtitle extracting unit 2A is realized in the broadcast receiver 2 in FIG. 11 which constitutes an information providing system. The subtitle extracting unit 2A extracts the subtitle data from the program data received by the broadcast receiver 2 and transmits the extracted subtitle data to the information providing server 1.

The program targeted for subtitle data extraction may be a program that a user of the subtitle extracting unit 2A is viewing or may be a program that the user is not viewing. Furthermore, the broadcast receiver 2 in which the subtitle data is extracted may be a receiver that is used for viewing a program and transmits the viewing log to the information providing server 1, or may be another receiver different from a receiver used for viewing a program.

A subtitle acquiring unit 125 of the information providing server 1 controls a communication unit 110 to acquire the subtitle data transmitted from the broadcast receiver 2 and stores the acquired subtitle data in an additional information DB 126. By extracting the subtitle data in each broadcast receiver 2, the subtitle data of all broadcast programs is stored in the additional information DB 126.

Figure 10:
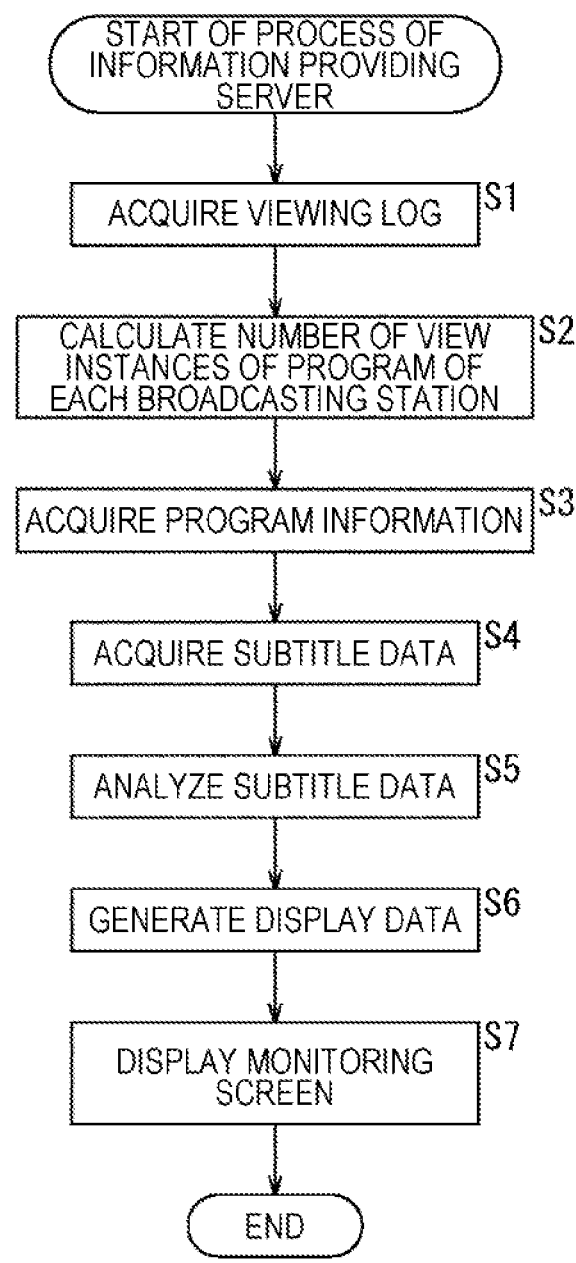
FIG. 10 is a flowchart for explaining an action of the information providing server.

In the information providing server 1 in FIG. 11, processes similar to the processes described with reference to FIG. 10 are performed, except for the process related to the acquisition of the subtitle data.

In this manner, the broadcast receiver 2 can be configured to extract the subtitle data.

Furthermore, besides the extraction of the subtitle data, the collection of the viewing logs and the acquisition of the program information also can be performed in another apparatus different from the information providing server 1 as appropriate. For example, in a case where the broadcast receiving unit 106 is not provided in the information providing server 1, at least the process of extracting the subtitle data and the process of acquiring the program information included in the broadcast wave signal are performed in an external device connected to the information providing server 1 via the network 4.

3. Variations

<3-1. Example of Displaying Text Data Other than Subtitle and Image Data>

The subtitle has been described as being added to the view instance count graph representing a change in the number of view instances; however, text data other than the subtitle representing the details of the program at each time may be added.

Figure 12:
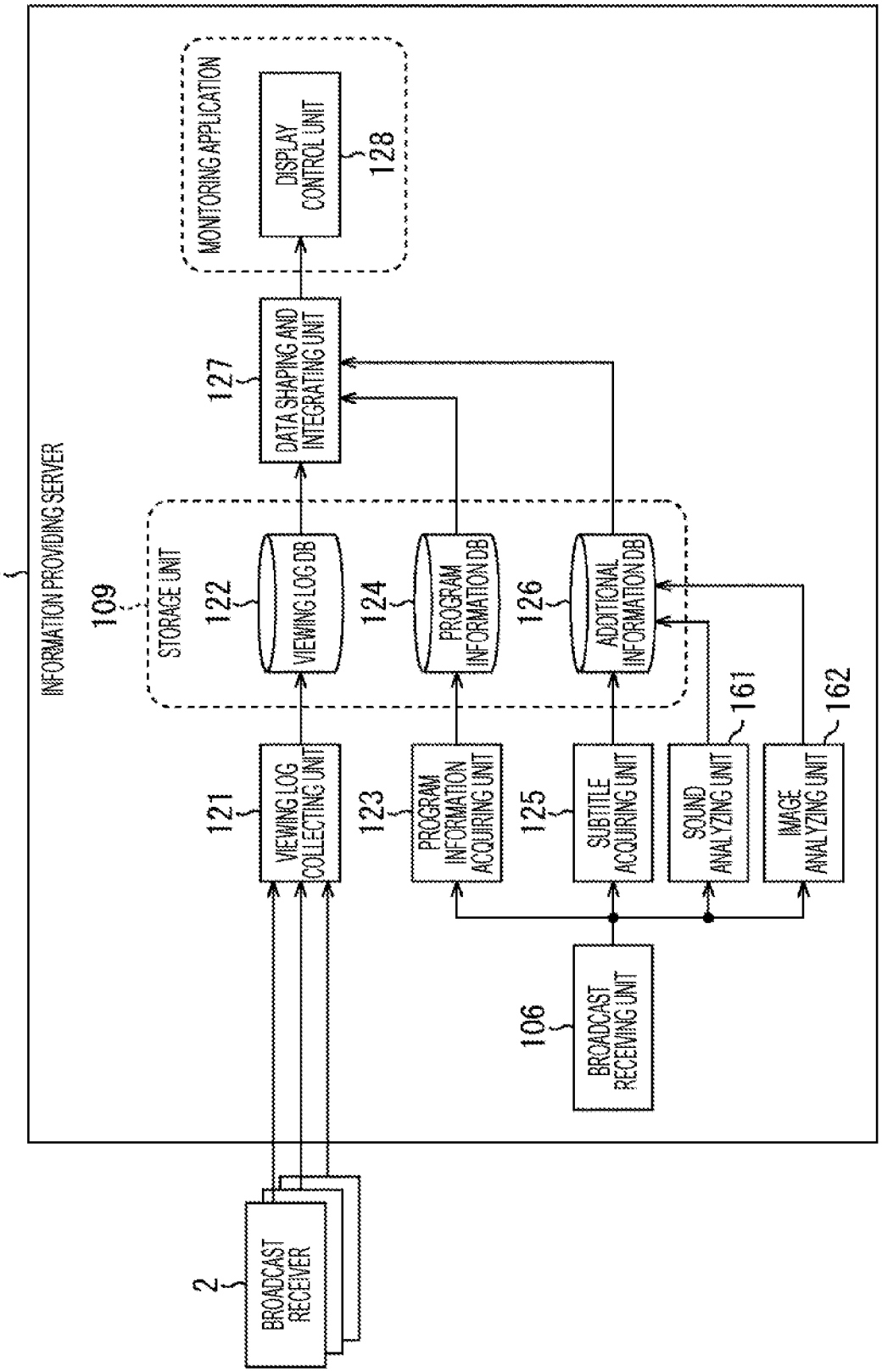
FIG. 12 is a block diagram illustrating another configuration example of the information providing server.

FIG. 12 is a block diagram illustrating another configuration example of the information providing server 1.

In the information providing server 1 in FIG. 12, a sound analyzing unit 161 and an image analyzing unit 162 are provided in addition to the configuration in FIG. 8. The data of the program received by the broadcast receiving unit 106 is also supplied to the sound analyzing unit 161 and the image analyzing unit 162.

The sound analyzing unit 161 analyzes sound data included in the data of the program and converts the sound of the program into text data. The text data obtained by converting the sound of the program at each time can be said to be text data representing the details of the program at each time. The sound analyzing unit 161 outputs the text data obtained by converting the sound to the additional information DB 126 together with information regarding the time at which each sound is output and stores the output text data in the additional information DB 126.

The image analyzing unit 162 analyzes video data included in the data of the program and recognizes letters displayed as an on-screen caption in each frame of the moving image of the program. The letters recognized by the image analyzing unit 162 include numerals, symbols, and the like. Text data obtained by converting the on-screen caption of the program at each time also can be said to be text data representing the details of the program at each time. The image analyzing unit 162 outputs the text data representing the recognition result to the additional information DB 126 together with information regarding the time at which each on-screen caption is displayed and stores the output text data in the additional information DB 126.

When the monitoring screen is displayed, the data shaping and integrating unit 127 reads the text data obtained by converting the sound at each time from the additional information DB 126 and displays the read text data in the vicinity of the plot position of the view instance count graph. In addition, the data shaping and integrating unit 127 displays the text data obtained by converting the sound at each time in the subtitle display field 13.

Furthermore, when the monitoring screen is displayed, the data shaping and integrating unit 127 reads the text data obtained by recognizing the on-screen caption at each time from the additional information DB 126 and displays the read text data in the vicinity of the plot position of the view instance count graph. In addition, the data shaping and integrating unit 127 arranges the text data obtained by recognizing the on-screen caption at each time and displays the arranged text data in the subtitle display field 13.

In this manner, text data other than the subtitle may be used as text data displayed on the monitoring screen together with the view instance count graph representing a change in the number of view instances.

Text data input as metadata of a program by a person who actually viewed the program may be used for displaying the monitoring screen. In this case, text data to which the time is added is transmitted from a device operated by the viewer of the program to the information providing server 1 and acquired by the subtitle acquiring unit 125.

Furthermore, text data posted on a social networking service (SNS) or the like by a viewer, who is a user of the broadcast receiver 2, may be used for displaying the monitoring screen. In this case, text data to which the time is added is transmitted from a device managing the website of the SNS to the information providing server 1 and acquired by the subtitle acquiring unit 125. In the information providing server 1, for example, the text data posted on the SNS is analyzed, and a keyword at each time is extracted and displayed on the monitoring screen.

The administrator of the information browsing device 3, who is a person browsing the monitoring screen, may be allowed to select which type of text data among the plurality of types of text data as described above is to be displayed on the monitoring screen.

Furthermore, a thumbnail image generated by capturing a scene at each time and an image generated by cutting out a letter (on-screen caption) portion from the moving image can be used as the display data representing the details of the program at each time. Since it is unnecessary to analyze the image and recognize letters, even in a case where it is difficult to recognize a letter displayed as an on-screen caption due to a decorative letter or the like, the details of the program at each time can be expressed.

In other words, not only text data but also various types of information such as image data can be used as the display data representing the details of the program at each time.

<3-2. Display Example of Monitoring Screen>

Figure 13:
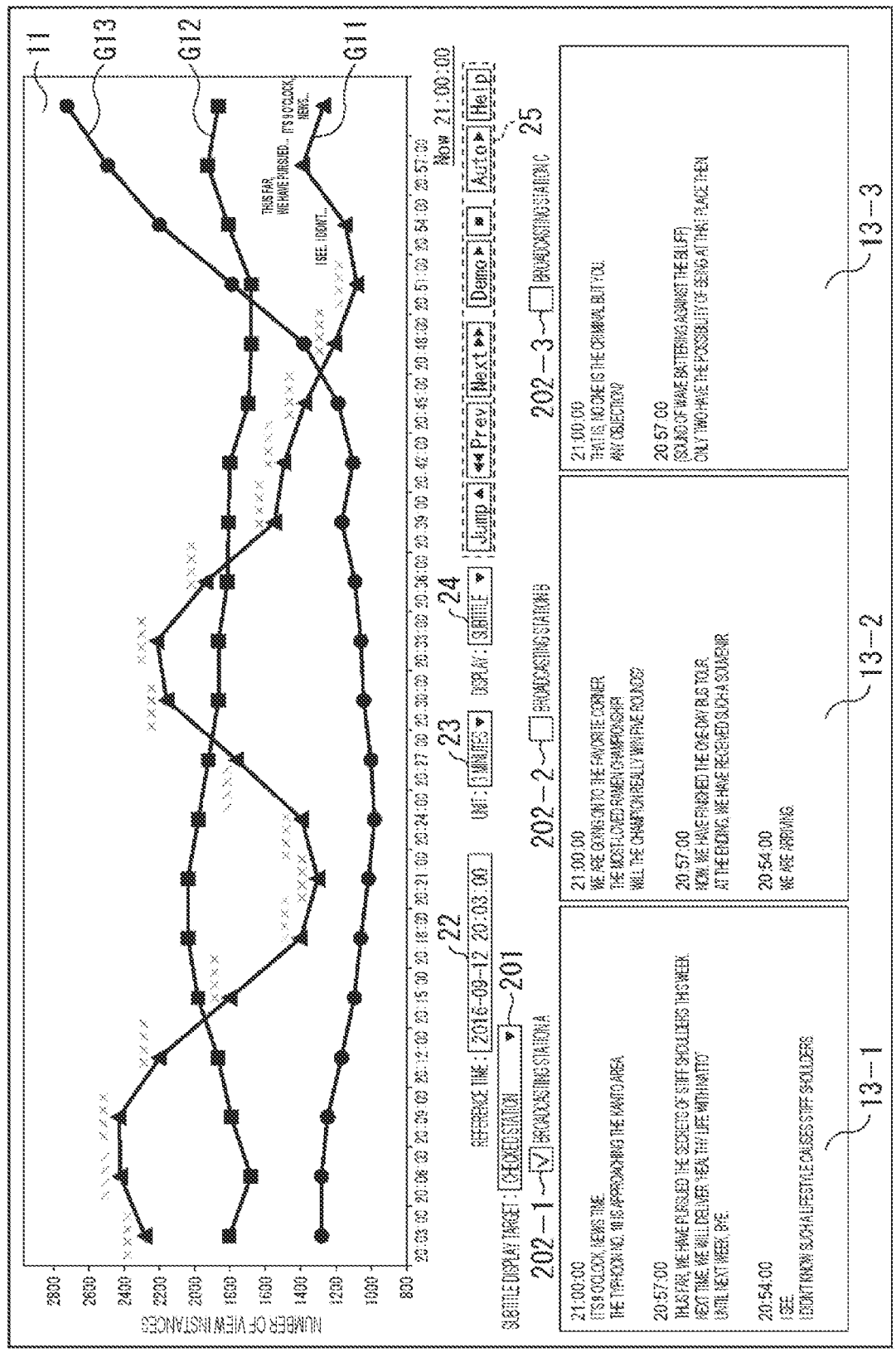
FIG. 13 is a diagram illustrating a display example of the monitoring screen.

FIG. 13 is a diagram illustrating another display example of the monitoring screen.

The monitoring screen in FIG. 13 is a screen on which the view instance count graphs of a plurality of broadcasting stations can be displayed. In the configuration illustrated in FIG. 13, the same reference numerals are given to the same components as the components of the monitoring screen illustrated in FIG. 3. Duplicated description will be omitted as appropriate.

Three view instance count graphs, namely, view instance count graphs G11, G12, and G13 are displayed in the viewing state display field 11. The view instance count graphs G11, G12, and G13 represent changes in the number of view instances of programs of broadcasting stations A, B, and C, respectively, which are different broadcasting stations selected by the administrator of the information browsing device 3.

For example, the view instance count graphs G11, G12, and G13 are displayed using different colors, plots having different shapes, different types of lines from each other.

In the example in FIG. 13, the subtitles are displayed only in the vicinity of the plot positions of the view instance count graph G11, and no subtitle is displayed in the vicinity of the plot positions of the view instance count graphs G12 and G13.

On the monitoring screen in FIG. 13, the administrator of the information browsing device 3 can select which broadcasting station is intended to display the subtitle on the viewing state display field 11. "xxxx" illustrated in the vicinity of the plot positions of the view instance count graph G11 represents predetermined letters constituting the subtitle.

In the lower part of the monitoring screen, subtitle display fields 13-1 to 13-3, which are the display areas of the subtitles of the programs of the broadcasting stations A, B and C, are formed side by side. The subtitles of the program of each broadcasting station are arranged in the display order and displayed in each of the subtitle display fields 13-1 to 13-3. As in the display of the subtitle display field 13 in FIG. 3, the display of the subtitle display fields 13-1 to 13-3 is updated with the lapse of time such that a subtitle during a unit time including the current time is displayed at the uppermost row.

Broadcasting station names are displayed above the respective subtitle display fields 13-1 to 13-3 and check boxes 202-1 to 202-3 are displayed on the left side of the broadcasting station names. A display target selection field 201 used for selecting the type of subtitle to be displayed is displayed above the check box 202-1.

The administrator of the information browsing device 3 can select a predetermined type of subtitle to be displayed from a list of display targets displayed when a downward triangle at the right end of the display target selection field 201 is pressed and display the subtitle of the selected type in the viewing state display field 11.

In the example in FIG. 13, "checked station" is selected as the type of subtitle to be displayed. The type of subtitle to be displayed is the "checked station", which means that the subtitle of the program of a broadcasting station whose check box is checked is displayed.

In a case where the check box 202-1 is checked and thus the broadcasting station A is selected as illustrated in FIG. 13, the subtitle at each time is displayed only in the vicinity of the plot position of the view instance count graph G11, as illustrated in the viewing state display field 11.

For example, in a case where the check box 202-1 is unchecked and the check box 202-2 is checked, the subtitle at each time is displayed in the viewing state display field 11 only in the vicinity of the plot position of the view instance count graph G12 representing the number of view instances of the program of the broadcasting station B. In a case where all the check boxes are checked, the subtitles of the programs of the broadcasting stations A, B, and C are displayed in the viewing state display field 11.

Figure 14:
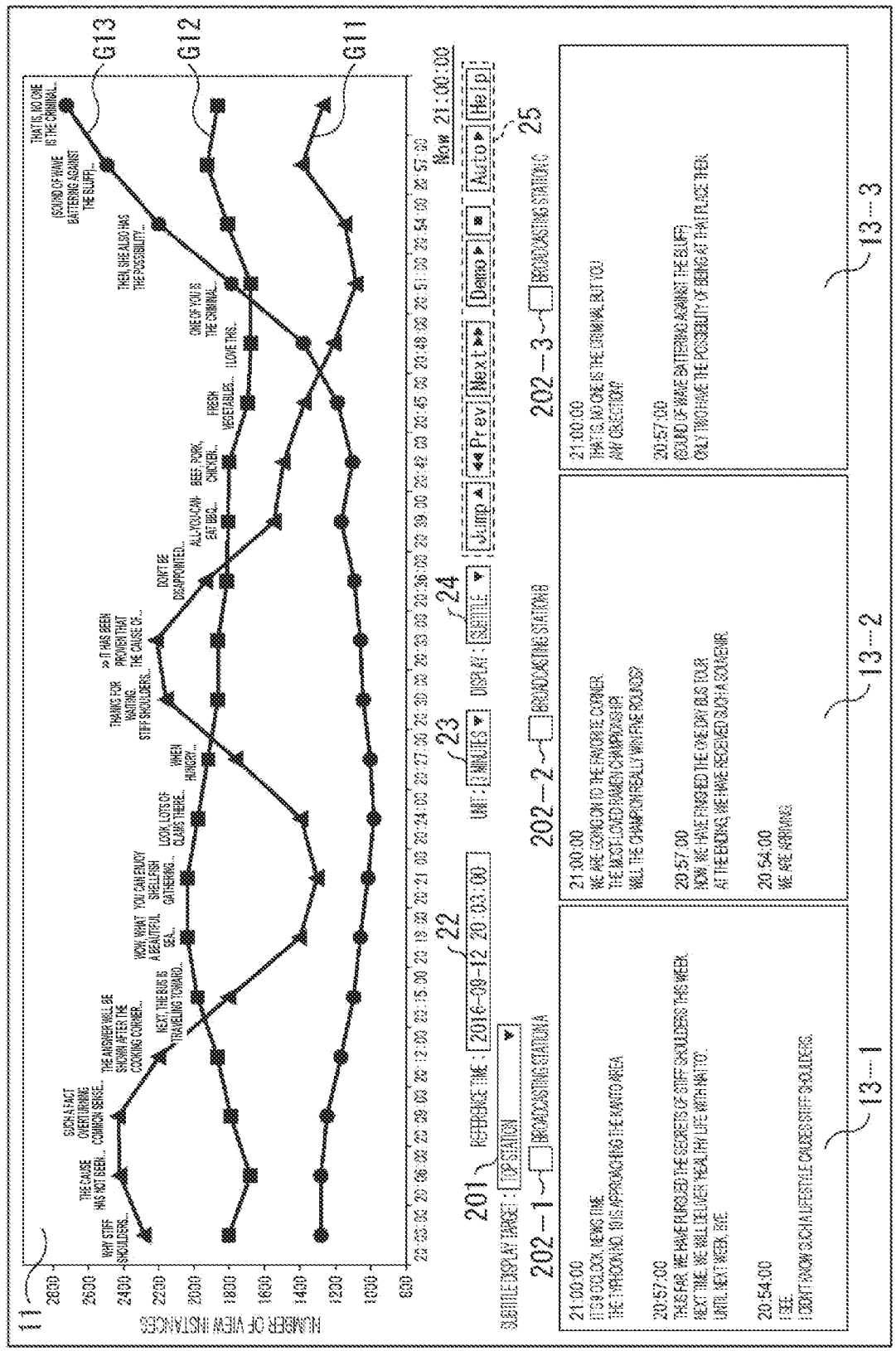
FIG. 14 is a diagram illustrating a display example of the monitoring screen.

FIG. 14 is a diagram illustrating a display example of the monitoring screen in a case where "top station" is selected as the type of subtitle to be displayed.

The type of subtitle to be displayed is "top station", which means that the subtitle of a program having the largest number of view instances is displayed at each time.

For example, as illustrated in the viewing state display field 11 in FIG. 14, at the timing of "20:03:00", which is the time at the left end, only the subtitle of the program of the broadcasting station A having the largest number of view instances is displayed in the vicinity of the plot position representing this largest number of view instances. In this case, the subtitles of the programs of the broadcasting stations B and C are not displayed.

Similarly, for example, at the timing of "21:00:00", which is the time at the right end, only the subtitle of the program of the broadcasting station C having the largest number of view instances is displayed in the vicinity of the plot position representing this largest number of view instances. In this case, the subtitles of the programs of the broadcasting stations A and B are not displayed.

In this manner, it is also possible to arrange the view instance count graphs representing changes in the number of view instances of programs of a plurality of broadcasting stations to display. On this display, the administrator of the information browsing device 3 can compare changes in the number of view instances of programs of respective broadcasting stations while confirming the details of the programs. Note that the number of view instance count graphs to be arranged and displayed is not confined to three and may be two, or four or more.

Figure 15:
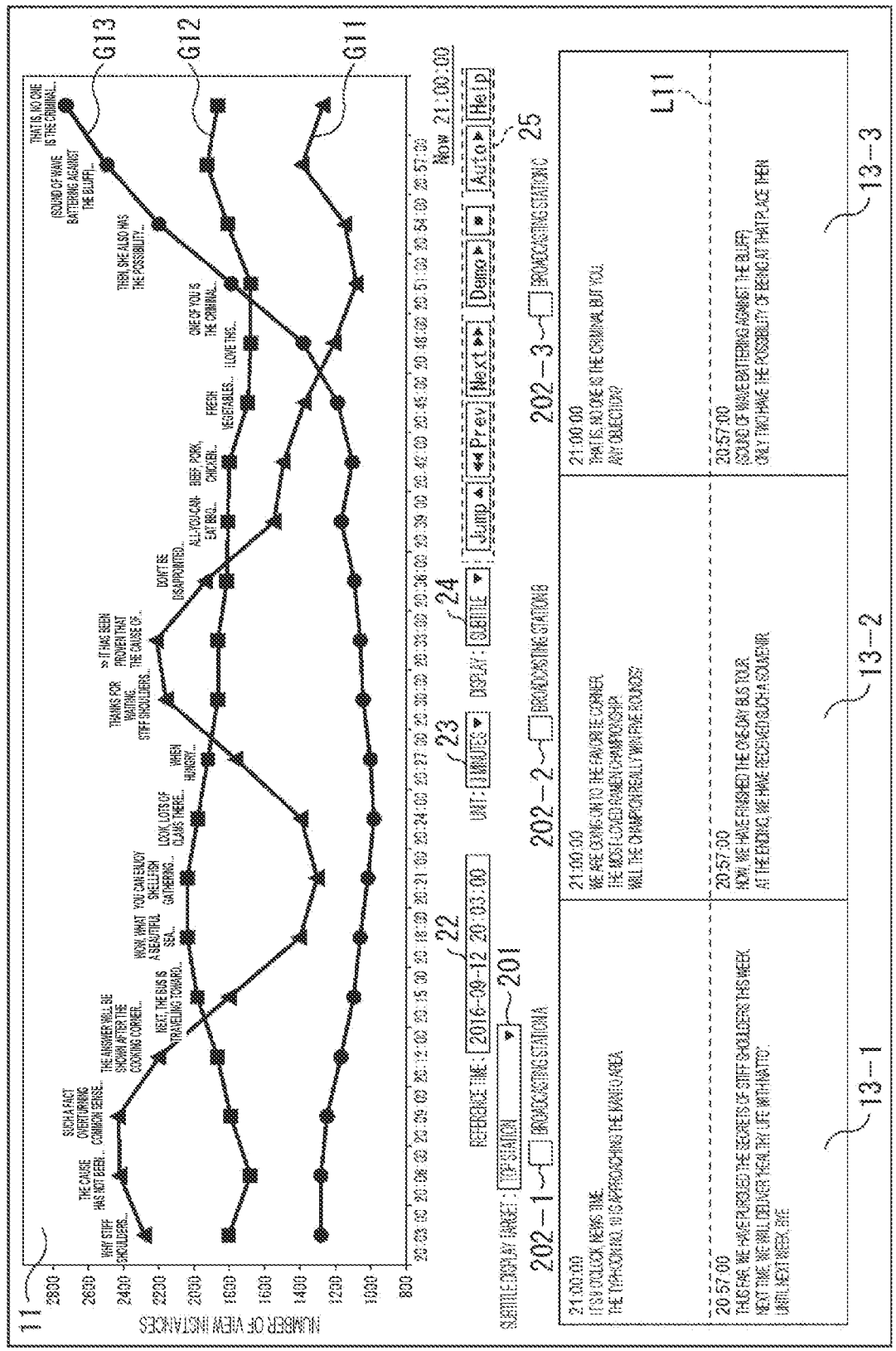
FIG. 15 is a diagram illustrating a display example of the monitoring screen.

FIG. 15 is a diagram illustrating a display example of the monitoring screen.

In a case where the view instance count graphs of a plurality of broadcasting stations are displayed as illustrated in FIGS. 13 and 14, the subtitles of programs of the respective broadcasting stations may be aligned with the display time as a reference and displayed in the subtitle display fields 13-1 to 13-3, as illustrated in FIG. 15.

In the example in FIG. 15, the subtitles of the programs of the respective broadcasting stations at "21:00:00" are displayed at the uppermost rows of the subtitle display fields 13-1 to 13-3 and, under these subtitles at the uppermost rows, the subtitles of the programs of the respective broadcasting stations at "20:57:00" are displayed in alignment with the height of a broken line L11.

On this display, the administrator of the information browsing device 3 can easily compare the subtitles of the programs of the respective broadcasting stations.

<3-3. Other Display Examples>

The subtitle has been described as being displayed as additional information representing the details of the program at each time; however, other information may be displayed. For example, it is possible to display peripheral information relating to the details of the program in accordance with the view instance count graph. In a case where the display area of the additional information is narrow, the peripheral information may be summarized and displayed.

Furthermore, the display of the view instance count graph may be automatically switched in response to the occurrence of a predetermined event, instead of simply proceeding in accordance with the lapse of time.

For example, it is also possible to stop the progress of the view instance count graph at a predetermined timing such as a case where a specific word is detected in a subtitle, a case where the number of view instances changes by exceeding a threshold value, a case where there is a movement in the ranking of the number of view instances, or a case where the program is switched.

In a case where a predetermined position of the view instance count graph is designated by an operation such as a click, a tap, or a mouseover, a subtitle at a time corresponding to the designated position may be precisely displayed.

In a case where the unit time is modified, the way of bundling subtitles displayed in the viewing state display field 11 and the subtitle display field 13 may be changed.

In a case where a keyword is input by the administrator of the information browsing device 3, a subtitle including the input keyword may be searched for such that the view instance count graph in a time zone including the display time of the retrieved subtitle is displayed in the viewing state display field 11. With such a search function, for example, trend survey becomes possible.

The unit of one scale on the vertical axis of the viewing state display field 11 may be automatically adjusted according to the number of view instances.

Furthermore, the subtitle displayed in addition to the view instance count graph may be displayed at a position changed according to the number of letters, or displayed by a display amount changed according to the number of letters.

In order to make it easier to perceive the switching timing of the program, the title of the program may be displayed in the vicinity of the view instance count graph, or the view instance count graph may be displayed with a color of the line changed for each program. Furthermore, the display format of numerals representing the time may be changed for each program, or the color of the background area of the view instance count graph may be changed for each program.

Matching between the keyword extracted from the subtitle and the program precise information may be performed such that the display changes according to the matching result.

For example, in a case where the keyword displayed in addition to the view instance count graph is a person's name, it is determined whether or not this person's name is included in the program precise information as a performer. Since the person's name is displayed with a display (e.g., color) changed according to the determination result, the browsing person can distinguish whether this person is a performer of the program or this person is merely talked about.

The appearance frequencies of keywords such as persons' names may be displayed as ranking. For example, in a drama program, the name of a part is displayed as a speaker in subtitles. In this case, the appearance frequency may be calculated by linking the speaker with the actual name.

In a case where the plot position on the view instance count graph is pressed, the display range of the view instance count graph may be shifted such that a time corresponding to the pressed position is displayed at the left end as the reference time. Furthermore, letters of the subtitle at the reference time may be displayed in a color changed from the color of other letters.

In a case where a keyword is selected, the selected keyword may be emphatically displayed, for example, by changing the color of the keyword included in the subtitle.

In a case where the view instance count graphs of a plurality of broadcasting stations are displayed, the display may be varied according to the ranking of the number of view instances, for example, by changing the thickness of the line or changing the color. Furthermore, only the view instance count graph of one selected broadcasting station may be emphatically displayed.

Moreover, in a case where there is a movement in the ranking of the number of view instances, an alert may be output at a predetermined timing such as a case where the peak of the number of view instances of a program of a certain broadcasting station is synchronized with the peak of the number of view instances of a program of another broadcasting station.

The details of a corner of the program may be estimated from the subtitle and the keyword such that the estimated details are displayed.

In a case where the administrator of the information browsing device 3 is wearing a transparent head mounted display (HMD) to browse the monitoring screen, the view instance count graph may be displayed on the monitoring screen and the subtitle may be displayed on the HMD.

Commercial detection may be performed such that the current time is corrected using the detected commercial start time and the time at which the number of view instances has dropped sharply. Normally, since the number of view instances is lowered in a case where a commercial is started, the timing of lowering can be used for time correction. In a case where the display of the view instance count graph is updated in real time, the display of the view instance count graph can also be controlled according to the corrected time, for example, by delaying the update of the number of view instances.

Sound analysis may be performed such that the time of the subtitle is corrected and displayed.

<3-4. Other Variations>

The above explanation has described the case of monitoring the viewing state of the program being broadcast via the transmission path for the broadcast wave or via the transmission path for the communication; however, the present technology can also be applied to the monitoring of the recording state.

Furthermore, the present technology may be used for monitoring the viewing state of a content item made up of sound, such as radio broadcasting, or the present technology may be used for monitoring the viewing state of a content item made up only of a moving image, such as an advertisement in train using a moving image. In other words, the content item to be monitored for the viewing state can be a content item including at least one of a moving image or a sound.

Furthermore, it has been described that a line graph is displayed on the monitoring screen as a chart representing the viewing state; however, other charts such as a bar chart and a table of the values of the number of view instances may be used.

It has been described that the monitoring screen is displayed by the web browser 3A in the information browsing device 3; however, the monitoring screen may be displayed by another browsing application. It has been described that the viewing state is browsed in real time using the monitoring screen; however, the monitoring screen may be used for browsing the accumulated viewing states to examine.

Example of Program

A series of the above-described processes can be executed by hardware as well and also can be executed by software. In a case where the series of processes is executed by software, a program constituting the software is installed in a computer built into dedicated hardware, a general-purpose personal computer, or the like.

The program to be installed is provided by being recorded in the removable medium 112 illustrated in FIG. 7, which is constituted by an optical disc (e.g., a compact disc-read only memory (CD-ROM) and a digital versatile disc (DVD)), a semiconductor memory, and the like. Furthermore, the program may be provided via a wired or wireless transmission medium such as a local area network, the Internet, or digital broadcasting. The program can be installed to the ROM 102 or the storage unit 109 in advance.

The program executed by a computer may be a program in which the processes are performed along the time series in accordance with the order described in the present description, or alternatively, may be a program in which the processes are performed in parallel or at a necessary timing, for example, when called.

Note that, in the present description, the system refers to a collection of a plurality of constituent members (e.g., devices and modules (components)) and whether or not all the constituent members are arranged within the same cabinet is not regarded as important. Accordingly, a plurality of devices accommodated in separate cabinets so as to be connected to one another via a network and one device of which a plurality of modules is accommodated within one cabinet are both deemed as systems.

The effects described in the present description merely serve as examples and not construed to be limited. There may be another effect as well.

The embodiments according to the present technology are not limited to the aforementioned embodiments and various modifications can be made without departing from the scope of the present technology.

For example, the present technology can employ a cloud computing configuration in which one function is divided and allocated to a plurality of devices so as to be processed in coordination thereamong via a network.

Furthermore, the respective steps described in the aforementioned flowchart can be executed by a plurality of devices each taking a share thereof as well as executed by a single device.

Moreover, in a case where a plurality of processes is included in one step, the plurality of processes included in one step can be executed by a plurality of devices each taking a share thereof as well as executed by a single device.

Combination Examples of Configurations

The present technology can be also configured as described below.

(1)
An information processing apparatus including:
a viewing log acquiring unit that acquires a viewing log of a content item including at least one of a moving image or a sound;
an acquiring unit that acquires display data representing details of the content item at each time; and
a display control unit that displays a chart representing a transition of a viewing state of the content item specified on the basis of the viewing log, and the display data representing details of the content item at each time in a time zone for which the transition of the viewing state is represented by the chart, on a screen that is one and the same.

(2)
The information processing apparatus according to (1) above, in which
the acquiring unit acquires data of a subtitle displayed in accordance with the moving image of the content item as the display data.

(3)
The information processing apparatus according to (2) above, in which
the display control unit displays a graph representing the transition of the viewing state as the chart, and displays at least a part of the subtitle at a time corresponding to each plot position in the vicinity of each plot position.

(4)
The information processing apparatus according to (3) above, further including a subtitle analyzing unit that analyzes the subtitle and extracts a keyword, in which
the display control unit displays the keyword extracted from the subtitle at a time corresponding to each plot position.

(5)
The information processing apparatus according to (3) or (4) above, in which
the display control unit arranges the subtitles in a display order and displays the arranged subtitles in a second display area constituting the screen, the second display area being different from a first display area which is a display area of the chart.

(6)
The information processing apparatus according to (5) above, further including a precise information acquiring unit that acquires precise information regarding the content item, in which
the display control unit displays the precise information in a third display area constituting the screen.

(7)
The information processing apparatus according to any one of (3) to (6) above, in which
the display control unit displays a graph for each of a plurality of providers, the graph representing the transition of the viewing state of the content item provided by each provider in line with a schedule defined in advance.

(8)
The information processing apparatus according to (7) above, in which
the display control unit displays at least a part of the subtitle in the vicinity of each plot position on the graph of a predetermined provider selected from among the providers by a person browsing the screen.

(9)
The information processing apparatus according to (7) above, in which
the display control unit displays at least a part of the subtitle in the vicinity of a plot position having a highest value representing the viewing state, among plot positions at each time on the graphs of the plurality of providers.

(10)
The information processing apparatus according to any one of (1) to (9) above, in which
the display control unit displays the chart by switching a unit time for representing the transition of the viewing state according to an operation by a person browsing the screen.

(11)
The information processing apparatus according to any one of (1) to (10) above, in which
the display control unit transmits data of the screen to an external device connected via a network and displays the screen on a display of the external device.

(12)
The information processing apparatus according to any one of (1) to (11) above, in which
the viewing log acquiring unit acquires the viewing log transmitted from a receiver configured to receive and reproduce the content item and used by a viewer of the content item.

(13)
The information processing apparatus according to (2) above, in which
the acquiring unit acquires data of the subtitle extracted from the content item by a receiver configured to receive the content item and transmitted from the receiver.

(14)
An information processing method including:
a step of acquiring a viewing log of a content item including at least one of a moving image or a sound;
a step of acquiring display data representing details of the content item at each time; and
a step of displaying a chart representing a transition of a viewing state of the content item specified on the basis of the viewing log, and the display data representing details of the content item at each time in a time zone for which the transition of the viewing state is represented by the chart, on a screen that is one and the same.

(15)

A program for causing a computer to execute a process including:

a step of acquiring a viewing log of a content item including at least one of a moving image or a sound;

a step of acquiring display data representing details of the content item at each time; and a step of displaying a chart representing a transition of a viewing state of the content item specified on the basis of the viewing log, and the display data representing details of the content item at each time in a time zone for which the transition of the viewing state is represented by the chart, on a screen that is one and the same.

REFERENCE SIGNS LIST

121 Viewing log collecting unit
122 Viewing log DB
123 Program information acquiring unit
124 Program information DB
125 Subtitle acquiring unit
126 Additional information DB
127 Data shaping and integrating unit
128 Display control unit
151 Viewing state detecting unit
152 Subtitle analyzing unit
153 Display data generating unit

The invention claimed is:

1. An information processing apparatus comprising:
a viewing log acquiring unit that acquires a viewing log of a content item including at least one of a moving image or a sound;
an acquiring unit that acquires display data representing details of the content item at each time; and
a display control unit that displays a chart representing a transition of a viewing state of the content item specified on a basis of the viewing log, and the display data representing details of the content item at each time in a time zone for which the transition of the viewing state is represented by the chart, on a screen that is one and the same,
wherein the acquiring unit acquires data of a subtitle displayed in accordance with the moving image of the content item as the display data,
wherein the display control unit displays a graph representing the transition of the viewing state as the chart, and displays at least a part of the subtitle at a time corresponding to each plot position in the vicinity of each plot position,
wherein the display control unit superimposes the part of the subtitle on the chart,
wherein the graph is updated every unit time, the unit time representing elapsed time for the content item and being selectable by a person viewing the graph, and when the graph is updated the plot positions are shifted along a time axis and the respective parts of the subtitle are shifted with the plot positions,
wherein the part of the subtitle is selectable, and when the part of the subtitle is selected the display control unit displays a pop-up window that includes a portion of the subtitle which is not included in the part of the subtitle, and
wherein the display control unit displays a graph for each of a plurality of providers, the graph representing the transition of the viewing state of the content item provided by each provider in line with a schedule defined in advance.

2. The information processing apparatus according to claim 1, further comprising a subtitle analyzing unit that analyzes the subtitle and extracts a keyword, wherein
the display control unit displays the keyword extracted from the subtitle at a time corresponding to each plot position.

3. The information processing apparatus according to claim 1, wherein
the display control unit arranges the subtitles in a display order and displays the arranged subtitles in a second display area constituting the screen, the second display area being different from a first display area which is a display area of the chart.

4. The information processing apparatus according to claim 3, further comprising a precise information acquiring unit that acquires precise information regarding the content item, wherein
the display control unit displays the precise information in a third display area constituting the screen.

5. The information processing apparatus according to claim 1, wherein
the display control unit displays at least a part of the subtitle in the vicinity of each plot position on the graph of a predetermined provider selected from among the providers by a person browsing the screen.

6. The information processing apparatus according to claim 1, wherein
the display control unit displays at least a part of the subtitle in the vicinity of a plot position having a highest value representing the viewing state, among plot positions at each time on the graphs of the plurality of providers.

7. The information processing apparatus according to claim 1, wherein
the display control unit displays the chart by switching a unit time for representing the transition of the viewing state according to an operation by a person browsing the screen.

8. The information processing apparatus according to claim 1, wherein
the display control unit transmits data of the screen to an external device connected via a network and displays the screen on a display of the external device.

9. The information processing apparatus according to claim 1, wherein
the viewing log acquiring unit acquires the viewing log transmitted from a receiver configured to receive and reproduce the content item and used by a viewer of the content item.

10. The information processing apparatus according to claim 1, wherein
the acquiring unit acquires data of the subtitle extracted from the content item by a receiver configured to receive the content item and transmitted from the receiver.

11. An information processing method comprising:
a step of acquiring a viewing log of a content item including at least one of a moving image or a sound;
a step of acquiring display data representing details of the content item at each time; and
a step of displaying a chart representing a transition of a viewing state of the content item specified on a basis of the viewing log, and the display data representing details of the content item at each time in a time zone for which the transition of the viewing state is represented by the chart, on a screen that is one and the same, wherein the step of acquiring display data comprises acquiring data of a subtitle displayed in accordance with the moving image of the content item as the display data, wherein the step of displaying comprises displaying a graph representing the transition of the viewing state as the chart, and displaying at least a part of the subtitle at a time corresponding to each plot position in the vicinity of each plot position, wherein the step of displaying comprises superimposing the part of the subtitle on the chart, wherein the graph is updated every unit time, the unit time representing elapsed time for the content item and being selectable by a person viewing the graph, and when the graph is updated the plot positions are shifted along a time axis and the respective parts of the subtitle are shifted with the plot positions, wherein the part of the subtitle is selectable, and when the part of the subtitle is selected the method includes displaying a pop-up window that includes a portion of the subtitle which is not included in the part of the subtitle, and wherein the step of displaying a chart comprises displaying a chart for each of a plurality of providers, the chart representing the transition of the viewing state of the content item provided by each provider in line with a schedule defined in advance.

12. A non-transitory computer-readable medium having stored thereon a program for causing a computer to execute a process comprising:

a step of acquiring a viewing log of a content item including at least one of a moving image or a sound;

a step of acquiring display data representing details of the content item at each time; and a step of displaying a chart representing a transition of a viewing state of the content item specified on a basis of the viewing log, and the display data representing details of the content item at each time in a time zone for which the transition of the viewing state is represented by the chart, on a screen that is one and the same, wherein the step of acquiring display data comprises acquiring data of a subtitle displayed in accordance with the moving image of the content item as the display data, wherein the step of displaying comprises displaying a graph representing the transition of the viewing state as the chart, and displaying at least a part of the subtitle at a time corresponding to each plot position in the vicinity of each plot position, wherein the step of displaying comprises superimposing the part of the subtitle on the chart, wherein the graph is updated every unit time, the unit time representing elapsed time for the content item and being selectable by a person viewing the graph, and when the graph is updated the plot positions are shifted along a time axis and the respective parts of the subtitle are shifted with the plot positions, wherein the part of the subtitle is selectable, and when the part of the subtitle is selected the process includes displaying a pop-up window that includes a portion of the subtitle which is not included in the part of the subtitle, and wherein the step of displaying a chart comprises displaying a chart for each of a plurality of providers, the chart representing the transition of the viewing state of the content item provided by each provider in line with a schedule defined in advance.

\* \* \* \* \*